(12) United States Patent
Adachi et al.

(10) Patent No.: US 12,006,615 B2
(45) Date of Patent: Jun. 11, 2024

(54) WASHING MACHINE AND CONTROL METHOD THEREOF

(71) Applicant: Samsung Electronics Co., Ltd., Suwon-si (KR)

(72) Inventors: Kosaku Adachi, Yokohama (JP); Hiroyuki Miyake, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 17/340,577

(22) Filed: Jun. 7, 2021

(65) Prior Publication Data

US 2021/0388552 A1 Dec. 16, 2021

(30) Foreign Application Priority Data

Jun. 15, 2020 (JP) .................................. 2020-102854
Apr. 14, 2021 (KR) .......................... 10-2021-0048537

(51) Int. Cl.
*H02P 27/08* (2006.01)
*D06F 34/04* (2020.01)
(Continued)

(52) U.S. Cl.
CPC .............. *D06F 34/08* (2020.02); *D06F 34/04* (2020.02); *D06F 34/06* (2020.02); *H02P 27/085* (2013.01); *H02P 2209/13* (2013.01)

(58) Field of Classification Search
CPC .......... D06F 34/08; D06F 34/04; D06F 34/06; H02P 27/085; H02P 2209/13
See application file for complete search history.

(56) References Cited

U.S. PATENT DOCUMENTS 8,134,326 B2 * 3/2012 Hayashi ................. B62D 5/046
318/599
8,217,602 B2 * 7/2012 Ikei ....................... H02P 29/032
318/432
(Continued)

FOREIGN PATENT DOCUMENTS

JP 2011-015452 A 1/2011
JP 2011-109803 A 6/2011
(Continued)

OTHER PUBLICATIONS

International Search Report dated Sep. 8, 2021, issued in International Application No. PCT/KR2021/095060.

*Primary Examiner* — Rina I Duda
(74) *Attorney, Agent, or Firm* — Jefferson IP Law, LLP

(57) ABSTRACT

A washing machine is provided. The washing machine includes an inner tub, a motor connected to the inner tub through a rotating shaft, an inverter circuit operatively connected to the motor and comprising three pairs of bridged switching elements, and at least one processor configured to provide a modulation signal to the inverter circuit to turn on or off the three pairs of bridged switching elements so as to convert DC power into AC power. The at least one processor is further configured to provide the modulation signal to two pairs of switching elements among the three pairs of bridged switching elements for a first time period in a first mode, provide the modulation signal to the three pairs of bridged switching elements for a second time period in a second mode, ad alternately perform the first mode and the second mode.

16 Claims, 26 Drawing Sheets

(51) Int. Cl.
*D06F 34/06* (2020.01)
*D06F 34/08* (2020.01)

(56) References Cited

U.S. PATENT DOCUMENTS

| | | | |
|---|---|---|---|
| 2012/0006065 A1* | 1/2012 | Jung | H02P 27/085 |
| | | | 68/12.02 |
| 2015/0155804 A1* | 6/2015 | Sakai | H02M 7/5395 |
| | | | 318/400.27 |
| 2016/0036360 A1* | 2/2016 | Maekawa | H02M 7/53873 |
| | | | 68/12.15 |
| 2016/0043670 A1* | 2/2016 | Nakamura | B62D 5/0487 |
| | | | 318/400.17 |
| 2016/0226126 A1* | 8/2016 | Daton-Lovett | H01Q 1/36 |
| 2018/0102723 A1 | 4/2018 | Kawashima et al. | |

FOREIGN PATENT DOCUMENTS

| | | |
|---|---|---|
| JP | 2011-259546 A | 12/2011 |
| JP | 2013-208009 A | 10/2013 |
| KR | 10-0316832 B1 | 1/2002 |

* cited by examiner

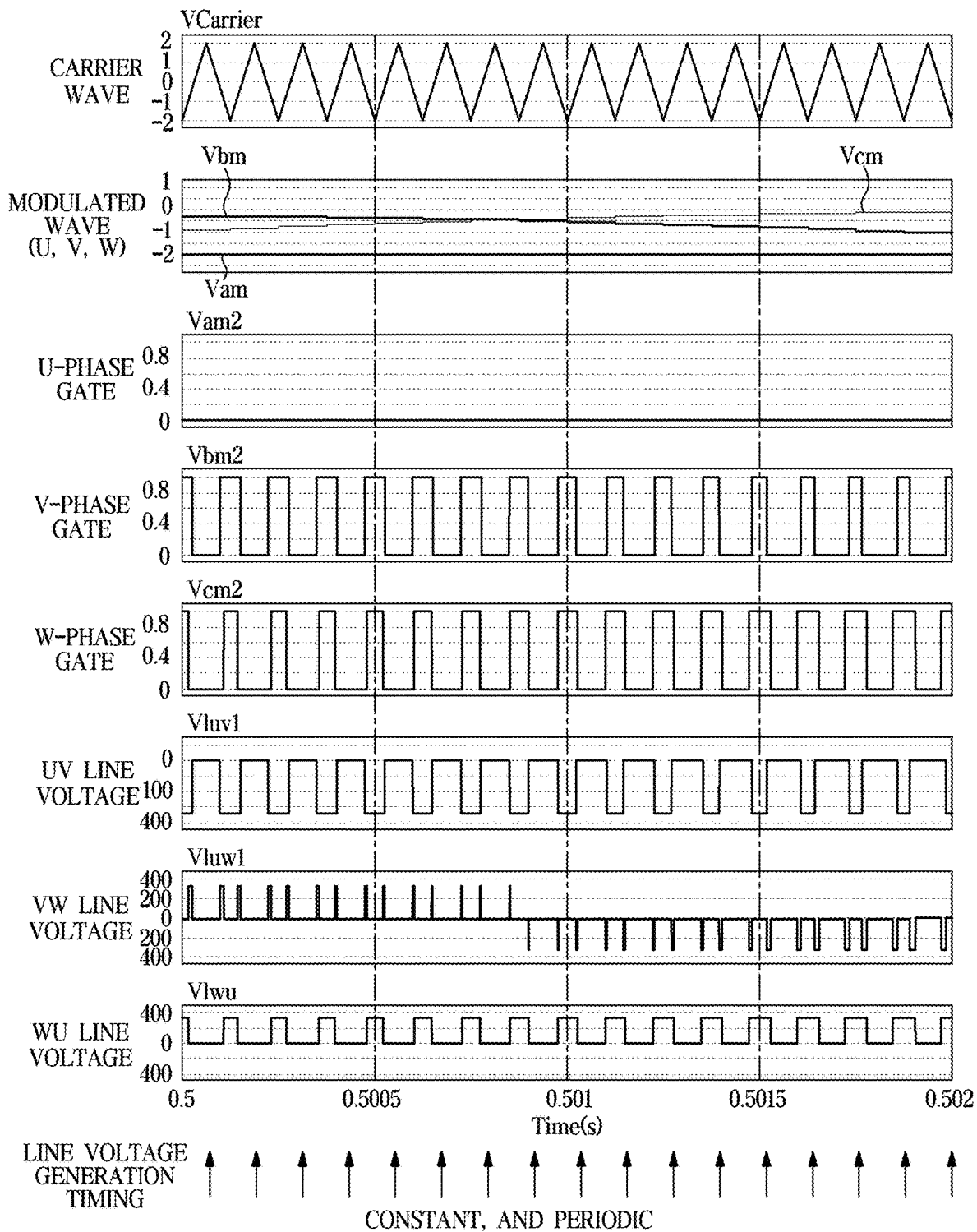

FIRST CARRIER FREQUENCY: 8 kHz
SECOND CARRIER FREQUENCY: 4.5 kHz
f2 / f1 = 0.5625

FIRST CARRIER FREQUENCY: 8 kHz
SECOND CARRIER FREQUENCY: 5.5 kHz
f2 / f1 = 0.6875

DUE TO THE DECREASE IN THE PERIODICITY OF THE LINE VOLTAGE GENERATION TIMING, A FREQUENCY PEAK OTHER THAN THE FIRST ORDER OF F1 IS GENERATED, MAKING THE NOISE UNACCEPTABLE.

FIRST CARRIER FREQUENCY: 8 kHz
SECOND CARRIER FREQUENCY: 6 kHz
f2 / f1 = 0.75

DUE TO THE DECREASE IN THE PERIODICITY OF THE LINE VOLTAGE GENERATION TIMING, A FREQUENCY PEAK OTHER THAN THE FIRST ORDER OF F1 IS GENERATED, MAKING THE NOISE UNACCEPTABLE.

REGULARLY PERFORMING THE FIRST MODE AND THE SECOND MODE

WASHING MACHINE AND CONTROL METHOD THEREOF

CROSS-REFERENCE TO RELATED APPLICATION(S)

This application is based on and claims priority under 35 U.S.C. § 119(a) of a Japanese patent application number 2020-102854, filed on Jun. 15, 2020, in the Japan Patent Office, and of a Korean patent application number 10-2021-0048537, filed on Apr. 14, 2021, in the Korean Intellectual Property Office, the disclosure of each of which is incorporated by reference herein in its entirety.

BACKGROUND

1. Field

The disclosure relates to a washing machine including an inverter circuit. More particularly, the disclosure relates to a washing machine including an inverter circuit capable of further reducing switching losses while suppressing noise performance to a level equivalent to that of a two-phase modulation method.

2. Description of Related Art

It is known that there are two-phase modulation method and three-phase modulation method as a phase width modulation (PWM) control method for an inverter circuit. The two-phase modulation method has an advantage of higher voltage utilization and lower switching loss than the three-phase modulation method, but has a disadvantage of lower noise performance than the three-phase modulation method.

Recently, technology development for reducing switching losses in the PWM control for the inverter circuit has been required for the purpose of miniaturization, low cost, and energy saving of cooling components. As a technology of reducing the switching loss, there is a method of lowering a carrier frequency determining a PWM period. In this case, there is a difficulty that the noise performance is unacceptably deteriorated due to a decrease in a fundamental frequency. The noise performance allowed in the inverter circuit is, at best, up to the same level as the two-phase modulation method.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a washing machine including an inverter circuit capable of further reducing switching losses while suppressing noise performance to a level equivalent to that of a two-phase modulation method.

Additional aspects will be set forth in part in the description which follows and, in part, will be apparent from the description, or may be learned by practice of the presented embodiments.

In accordance with an aspect of the disclosure, a washing machine is provided. The washing machine includes an inner tub, a motor connected to the inner tub through a rotating shaft, an inverter circuit operatively connected to the motor and including three pairs of bridged switching elements, and at least one processor configured to provide a modulation signal to the inverter circuit to turn on or off the three pairs of bridged switching elements so as to convert DC power into AC power. The at least one processor is further configured to provide the modulation signal to two pairs of switching elements among the three pairs of bridged switching elements for a first time period in a first mode, provide the modulation signal to the three pairs of bridged switching elements for a second time period in a second mode, and alternately perform the first mode and the second mode.

In accordance with another aspect of the disclosure, a control method of a washing machine is provided. The method includes an inner tub and a motor connected to the inner tub through a rotating shaft, the control method includes providing a modulation signal turning on or off three pairs of bridged switching elements to an inverter circuit operatively connected to the motor and including the three pairs of bridged switching elements. The providing of the modulation signal to the inverter circuit includes alternately performing a first mode and a second mode, providing the modulation signal to two pairs of switching elements among the three pairs of bridged switching elements for a first time period in the first mode, and providing the modulation signal to the three pairs of bridged switching elements for a second time period in the second mode.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7A is a diagram illustrating a line voltage generation timing of a motor drive according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
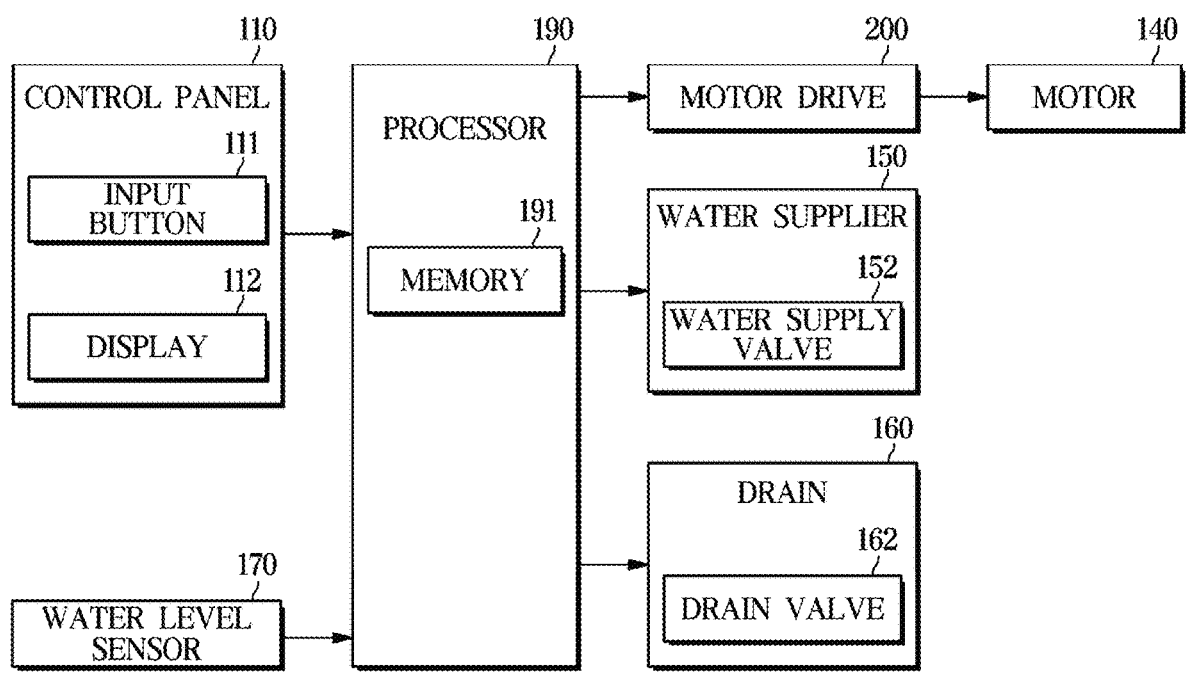
FIG. 1 is a diagram illustrating a configuration of a washing machine according to an embodiment of the disclosure.

FIG. 1 is a diagram illustrating a configuration of a washing machine according to an embodiment of the disclosure.

Figure 2:
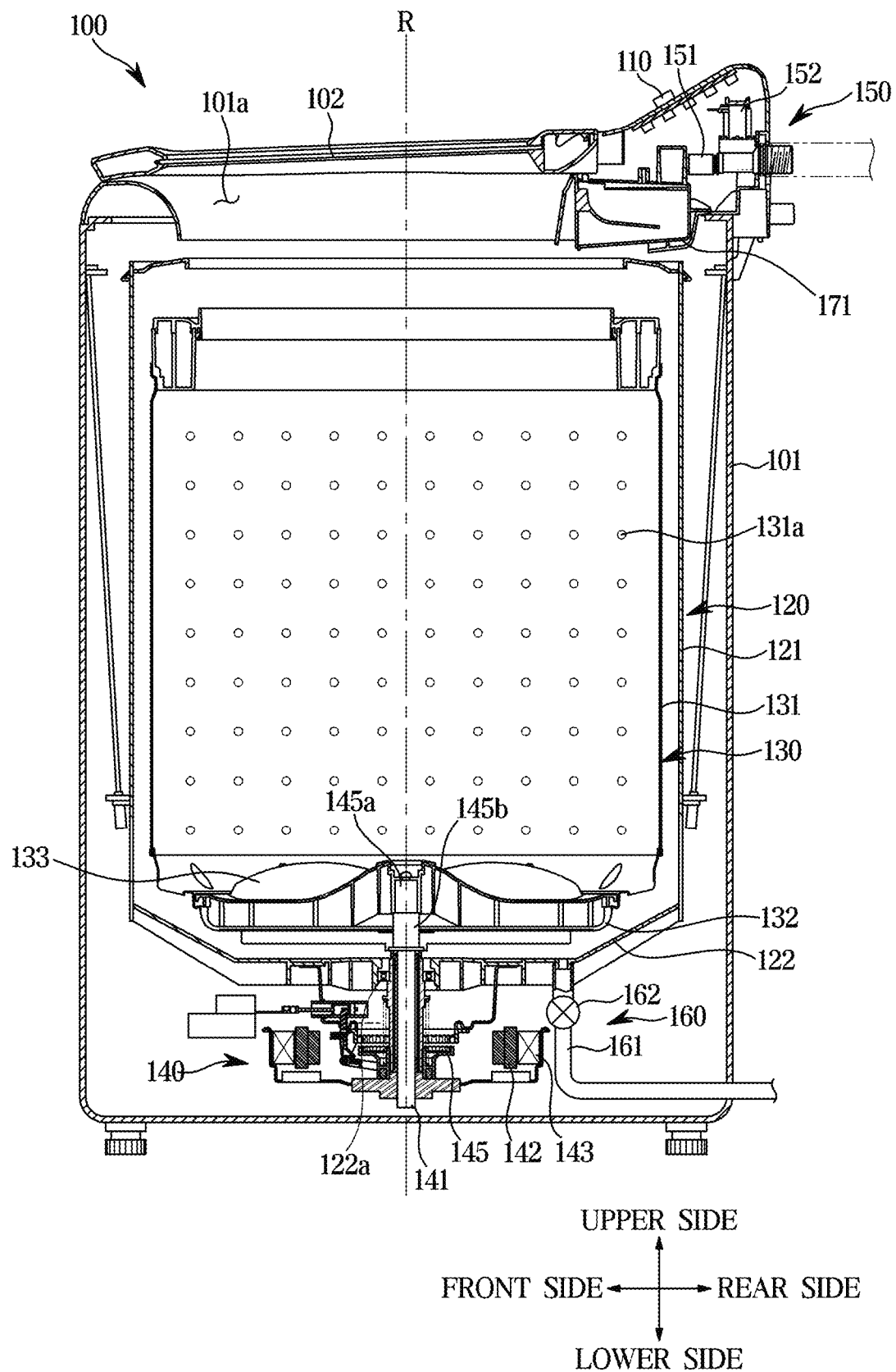
FIG. 2 is a view illustrating a washing machine according to an embodiment of the disclosure.

FIG. 2 is a view illustrating a washing machine according to an embodiment of the disclosure.

Figure 3:
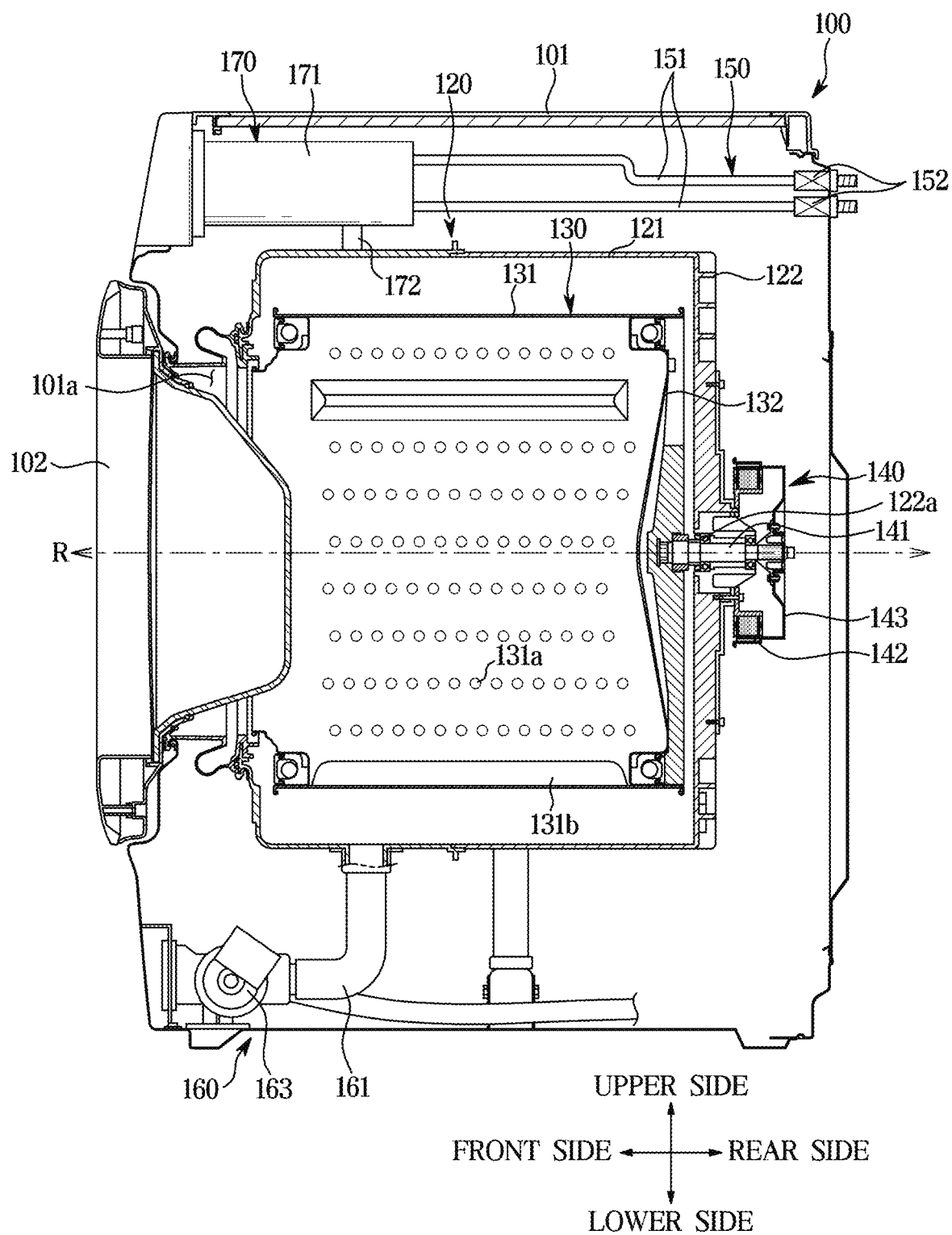
FIG. 3 is a view illustrating a washing machine according to an embodiment of the disclosure.

FIG. 3 is a view illustrating a washing machine according to an embodiment of the disclosure.

Referring to FIGS. 1, 2, and 3, the washing machine 100 may include a control panel 110, an outer tub 120, an inner tub 130, a motor 140, a water supplier 150, a detergent supplier 155, a drain 160, a motor drive 200, a water level sensor 170, and a processor 190.

The washing machine 100 may include a cabinet 101 provided to accommodate components included in the washing machine 100. In the cabinet 101, the control panel 110, the water level sensor 170, the motor drive 200, the motor 140, the water supplier 150, the drain 160, the detergent supplier 155, the inner tub 130 and the outer tub 120 may be accommodated.

An inlet 101a provided to allow laundry to be inserted or withdrawn is provided on one side of the cabinet 101.

For example, the washing machine 100 may include a top-loading washing machine in which the inlet 101a provided to allow laundry to be inserted or withdrawn is disposed on an upper surface of the cabinet 101 as shown in FIG. 2 or a front-loading washing machine in which the inlet 101a provided to allow laundry to be inserted or withdrawn is disposed on a front surface of the cabinet 101. In other words, the washing machine 100 according to an embodiment is not limited to a top-loading washing machine or a front-loading washing machine, and may be any of a top-loading washing machine and a front-loading washing machine. Alternatively, the washing machine 100 may include other loading type washing machines in addition to the top-loading washing machine and the front-loading washing machine.

A door 102 configured to open and close the inlet 101a is provided on one side of the cabinet 101. The door 102 may be provided on the same surface as the inlet 101a, and may be rotatably mounted to the cabinet 101 by a hinge.

The control panel 110 configured to provide a user interface for interaction with a user may be installed on one surface of the cabinet 101.

For example, the control panel 110 may include an input button 111 configured to obtain a user input, and a display 112 configured to display washing setting or washing operation information in response to the user input.

The input button 111 may include a power button, an operation button, a course selection dial (or a course selection button), and a washing/rinsing/spinning setting button. The input button may include a tact switch, a push switch, a slide switch, a toggle switch, a micro switch, or a touch switch. The input button 111 may provide an electrical output signal corresponding to a user input to the processor 190.

The display 112 may include a screen configured to display a washing course, which is selected by rotating the course selection dial (or by pressing the course selection button) and an operating time of the washing machine, and an indicator configured to display washing setting/rinsing setting/spinning setting selected through the setting button. The display may include a liquid crystal display (LCD) panel, and a light emitting diode (LED) panel. The display 112 may receive information to be displayed from the processor 190 and display information corresponding to the received information.

In the cabinet 101, the outer tub 120 may be provided. The outer tub 120 may contain water for the washing or rinsing.

The outer tub 120 may have a cylindrical shape with an open bottom surface. The outer tub 120 may include a substantially circular outer tub bottom surface 122 and an outer tub sidewall 121 provided along a circumference of the outer tub bottom surface 122. In order to allow laundry to be inserted or withdrawn, the other bottom surface of the outer tub 120 may be opened or an opening may be formed thereon.

As for the top-loading washing machine, the outer tub 120 may be arranged such that the outer tub bottom surface 122 faces the bottom of the washing machine and a central axis R of the outer tub sidewall 121 is substantially perpendicular to the floor, as illustrated in FIG. 2. In addition, as for the front-loading washing machine, the outer tub 120 is arranged such that the outer tub bottom surface 122 faces the rear of the washing machine and a central axis R of the outer tub sidewall 121 is substantially parallel to the floor, as illustrated in FIG. 3.

A bearing 122a configured to rotatably fix the motor 140 may be provided on the outer tub bottom surface 122.

The inner tub 130 may be rotatably provided inside the outer tub 120. The inner tub 130 may accommodate laundry, that is, a load.

The inner tub 130 may have a cylindrical shape with an open bottom surface. The inner tub 130 may include a substantially circular inner tub bottom surface 132 and an inner tub sidewall 131 provided along a circumference of the inner tub bottom surface 132. In order to allow laundry to be inserted or withdrawn, the other bottom surface of the inner tub 130 may be opened or an opening may be formed thereon.

As for the top-loading washing machine, the inner tub 130 may be arranged such that the inner tub bottom surface 132 faces the bottom of the washing machine and a central axis R of the inner tub sidewall 131 is substantially perpendicular to the floor, as illustrated in FIG. 2. In addition, as for the front-loading washing machine, the inner tub 130 is arranged such that the inner tub bottom surface 132 faces the rear of the washing machine and the central axis R of the inner tub sidewall 131 is substantially parallel to the floor, as illustrated in FIG. 3.

A through hole 131a provided to connect the inside to the outside of the inner tub 130 to allow water, which is supplied to the outer tub 120, to flow into the inside of the inner tub 130 may be provided on the inner tub side wall 131.

As for the top-loading washing machine, a pulsator 133 may be rotatably provided inside the inner tub bottom surface 132, as illustrated in FIG. 2. The pulsator 133 may be rotated independently of the inner tub 130. The pulsator 133 may be rotated in the same direction as the inner tub 130 or in a direction different from the inner tub 130. The pulsator 133 may be rotated at the same rotational speed as the inner tub 130 or at a rotational speed different from the inner tub 130.

As for the front-loading washing machine, a lifter 131b provided to lift laundry to an upper portion of the inner tub 130 is provided on the inner tub sidewall 131 as illustrated in FIG. 3.

The inner tub bottom surface 132 may be connected to a rotating shaft 141 of the motor 140 configured to rotate the inner tub 130.

The motor 140 may generate a torque to rotate the inner tub 130.

The motor 140 may be provided outside the outer tub bottom surface 122 of the outer tub 120 and connected to the inner tub bottom surface 132 of the inner tub 130 through the rotating shaft 141. The rotating shaft 141 may pass through the outer tub bottom surface 122 and may be rotatably supported by the bearing 122a provided on the outer tub bottom surface 122.

The motor 140 may include a stator 142 fixed to the outside of the outer tub bottom surface 122 and a rotor 143 configured to be rotatable with respect to the outer tub 120 and the stator 142. The rotor 143 may be connected to the rotating shaft 141.

The rotor 143 may be rotated by magnetic interaction with the stator 142, and the rotation of the rotor 143 may be transmitted to the inner tub 130 through the rotating shaft 141.

The motor 140 may include a brushless direct current motor (BLDC Motor) or a permanent synchronous motor (PMSM) for easy control of the rotational speed.

As for the top-loading washing machine, a clutch 145 configured to transmit the torque of the motor 140 to both the pulsator 133 and the inner tub 130 or to the pulsator 133 may be provided, as illustrated in FIG. 2. The clutch 145 may be connected to the rotating shaft 141. The clutch 145 may distribute the rotation of the rotating shaft 141 to an inner shaft 145a and an outer shaft 145b. The inner shaft 145a may be connected to the pulsator 133. The outer shaft 145b may be connected to the inner tub bottom surface 132. The clutch 145 may transmit the rotation of the rotating shaft 141 to both the pulsator 133 and the inner tub 130 through the inner shaft 145a and the outer shaft 145b, or transmit the rotation of the rotating shaft 141 to only the pulsator 133 through the inner shaft 145a.

The water supplier 150 may supply water to the outer tub 120 and the inner tub 130. The water supplier 150 includes a water supply conduit 151 provided to supply water to the outer tub 120 by being connected to an external water supply source, and a water supply valve 152 provided on the water supply conduit 151. The water supply conduit 151 is provided on the upper side of the outer tub 120 to extend from the external water supply source to a detergent container 156. Water may be guided to the outer tub 120 through the detergent container 156. The water supply valve 152 may allow or block the supply of water from the external water supply source to the outer tub 120 in response to an electrical signal. The water supply valve 152 may include a solenoid valve configured to open and close in response to an electrical signal.

The detergent supplier 155 may supply detergent to the outer tub 120 and the inner tub 130. The detergent supplier 155 includes the detergent container 156 provided above the outer tub 120 to store detergent, and a mixing conduit 157 provided to connect the detergent container 156 to the outer tub 120. The detergent container 156 may be connected to the water supply conduit 151, and water, which is supplied through the water supply conduit 151, may be mixed with the detergent of the detergent container 156. The mixture of detergent and water may be supplied to the outer tub 120 through the mixing conduit 157.

The drain 160 may discharge water contained in the outer tub 120 or the inner tub 130 to the outside. The drain 160 may include a drain conduit 161 provided under the outer tub 120 and provided to extend from the outer tub 120 to the outside of the cabinet 101. As for the top-loading washing machine, the drain 160 may further include a drain valve 162 provided in the drain conduit 161, as illustrated in FIG. 2. As for the front-loading washing machine, as illustrated in FIG. 3, the drain 160 may further include a drain pump 163 provided on the drain conduit 161.

The water level sensor 170 may be installed at the end of a connection hose connected to a lower portion of the outer tub 120. In this case, a water level of the connection hose may be the same as a water level of the outer tub 120. As the water level of the outer tub 120 increases, the water level of the connection hose may increase, and thus an internal pressure of the connection hose may increase due to the increase of the water level of the connection hose.

The water level sensor 170 may measure the internal pressure of the connection hose, and may output an electrical signal corresponding to the measured pressure to the processor 190. The processor 190 may identify the water level of the connection hose, that is, the water level of the outer tub 120 based on the pressure of the connection hose measured by the water level sensor 170.

The motor drive 200 may receive a drive signal from the processor 190, and based on the drive signal of the processor 190, the motor drive 200 may supply a drive current, which is to rotate the rotating shaft 141 of the motor 140, to the motor 140.

The motor drive 200 is described below.

The processor 190 may be mounted on a printed circuit board provided on the rear surface of the control panel 110.

The processor 190 may be electrically connected to the control panel 110, the water level sensor 170, the motor drive 200, the water supply valve 152, or the drain valve 162/drain pump 163.

The processor 190 may process the output signal of the control panel 110, the water level sensor 170, or the motor drive 200, and based on the processing of the output signal, the processor 190 may provide a control signal to the motor drive 200, the water supply valve 152, and the drain valve 162/drain pump 163.

The processor 190 may include a memory 191 configured to store or memorize programs (a plurality of instructions) or data for processing signals and providing control signals. The memory 191 may include a volatile memory, such as a static random access memory (S-RAM) and a dynamic random access memory, (D-RAM), and a non-volatile memory, such as a read only memory (ROM), and an erasable programmable read only memory (EPROM). The memory 191 may be provided integrally with the processor 190 referring to FIG. 1 or may be provided as a semiconductor device separated from the processor 190.

The processor 190 may further include a processing core (for example, an operation circuit, a memory circuit, and a control circuit) configured to process signals and configured to output control signals based on programs or data stored in the memory 191.

The processor 190 may receive a user input from the control panel 110 and may process the user input. The processor 190 may provide a control signal to the motor drive 200, the water supply valve 152, and the drain valve 162/drain pump 163 to sequentially perform the washing, rinsing, and spinning processes in response to a user input.

The processor 190 may receive a water level measured by the water level sensor 170. The processor 190 may provide a water supply signal to the water supply valve 152 or provide a drain signal to the drain valve 162/drain pump 163 based on a comparison between the measured water level and a target water level.

The processor 190 may provide a drive signal to the motor drive 200 to allow the motor 140 to rotate the inner tub 130. For example, the processor 190 may provide a drive signal for washing to the motor drive 200. In addition, the processor 190 may provide a drive signal for spinning to the motor drive 200.

Figure 4:
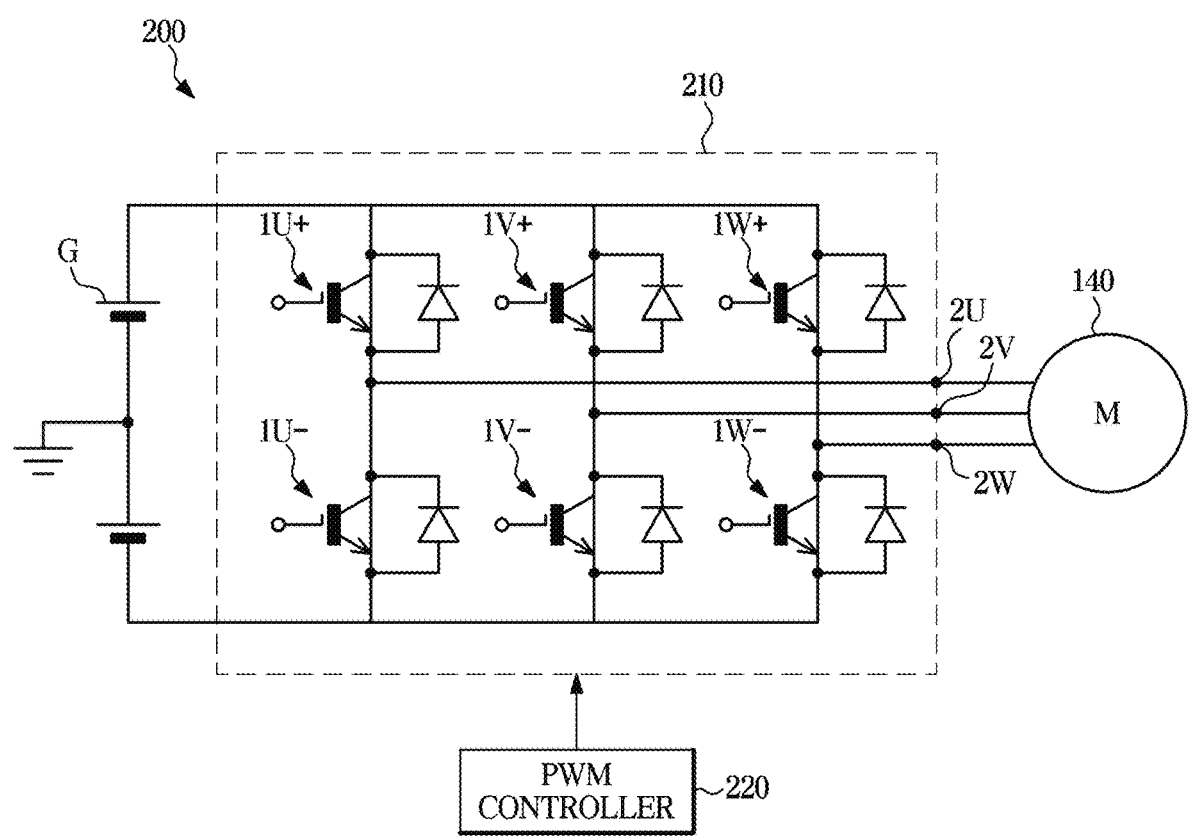
FIG. 4 is a schematic view illustrating a circuit configuration of a motor drive according to an embodiment of the disclosure.

FIG. 4 is a schematic view illustrating a circuit configuration of a motor drive according to an embodiment of the disclosure.

Referring to FIG. 4, the motor drive 200 according to an embodiment may rotate an inner tub motor of a washing machine (or a drying machine), drive a compressor of a refrigerator, drive a compressor of an air conditioner, drive a fan of an air conditioner (or an air purifier) or drive a suction motor of a cleaner.

The motor drive 200, according to an embodiment of the disclosure, may be connected to a DC power supply G, convert DC power, which is input from the DC power supply G, into three-phase AC power in a pulse width modulation (PWM) method, and supply the three-phase AC power to a load. The load may be a three-phase AC load including a three-phase coil, and for example, the load may be a three-phase synchronous motor 140.

For example, the motor drive 200 may include an inverter circuit 210 and a PWM controller 220. The motor drive 200 may be configured to turn on/off the switching element of the inverter circuit 210 according to a PWM signal output from the PWM controller 220. Accordingly, the motor drive 200 may convert DC power into three-phase AC power, and output a U-phase current, a V-phase current and a W-phase current, in which an electric angle is shifted from each other by 120°, to three-phase terminals 2U, 2V and 2W. The U-phase, V-phase, and W-phase AC currents may be respectively input to the U-, V-, and W-phase armature windings (not shown) of the three-phase motor 140.

The inverter circuit 210 may include a three-phase bridge circuit composed of three-phase arm corresponding to the U-phase, V-phase, and W-phase of the motor 140. For example, referring to FIG. 4, the inverter circuit 210 may include switching elements 1U+, 1V+, and 1W+ on an upper arm side and switching elements 1U−, 1V−, and 1W− on a lower arm side connected in series to the switching elements 1U+, 1V+, and 1W+, respectively. A U-phase terminal 2U may be connected to a connection point of the switching elements 1U+ and 1U−. A V-phase terminal 2V may be connected to a connection point of the switching elements 1V+ and 1V−. A W-phase terminal 2W may be connected to a connection point of the switching elements 1W+ and 1W−. By turning on/off the switching elements 1U+, 1V+, 1W+, 1U−, 1V−, and 1W−, the inverter circuit 210 may convert the input DC power into AC power and supply the AC power to the load. The switching elements 1U+, 1V+, 1W+, 1U−, 1V−, and 1W− may include a bipolar transistor, a power MOSFET, or an IGBT, but is not limited thereto.

The PWM controller 220 may include a general-purpose computer or a dedicated computer including a central processing unit (CPU) (for example, a processor), a memory and an input/output interface. The PWM controller 220 may cooperate with CPU or peripheral devices according to predetermined program stored in a predetermined area of the memory, thereby implementing its function. For example, the PWM controller 220 may output a PWM signal to each switching element 1U+, 1V+, 1W+, 1U−, 1V−, and 1W− of the inverter circuit 210, and may control switching of the switching elements.

Figure 5:
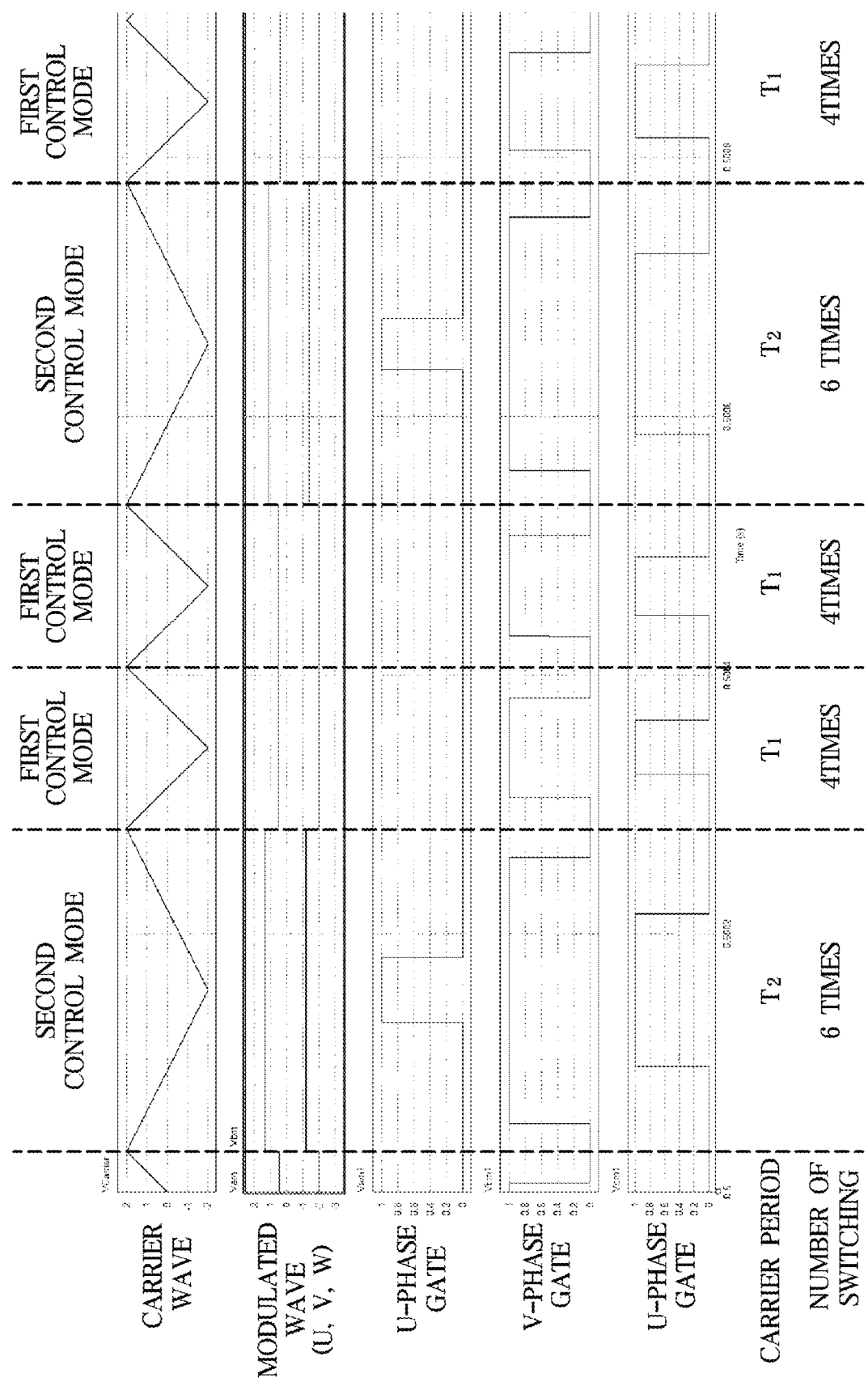
FIG. 5 is a view illustrating a control pattern of a motor drive according to an embodiment of the disclosure.

FIG. 5 is a view illustrating a control pattern of a motor drive according to an embodiment of the disclosure.

Referring to FIG. 5, the PWM controller 220 may include a first control mode for performing PWM control by outputting a PWM signal to two phase switching elements among three phase switching elements through the two-phase modulation, and a second control mode for performing PWM control by outputting a PWM signal to three phase switching elements through the three-phase modulation. The PWM controller 220 may be configured to alternately switch between the first control mode and the second control mode. In the first control mode, the PWM controller 220 may fix one of the U, V, and W phases in a conductive state or a non-conductive state (for example, the PWM controller fixes the U phase as a non-conductive state).

Referring to FIG. 5, the PWM controller 220 may set a second carrier frequency f2, which is to determine a PWM period of the second control mode (three-phase modulation mode), to be smaller than a first carrier frequency f1 that is to determine a PWM period of the first control mode (two-phase modulation mode). For example, the first carrier frequency f1 and the second carrier frequency f2 may be set to satisfy the relationship of the following Formula 1.

$$0.4 \leq f2/f1 \leq 0.6 \qquad \text{Formula 1}$$

For example, the second carrier frequency f2 may be set to be about ½ of the first carrier frequency f1. For example, the first carrier frequency f1 may be set to 8 kHz, and the second carrier frequency f2 may be set to 4 kHz.

Figure 6A:
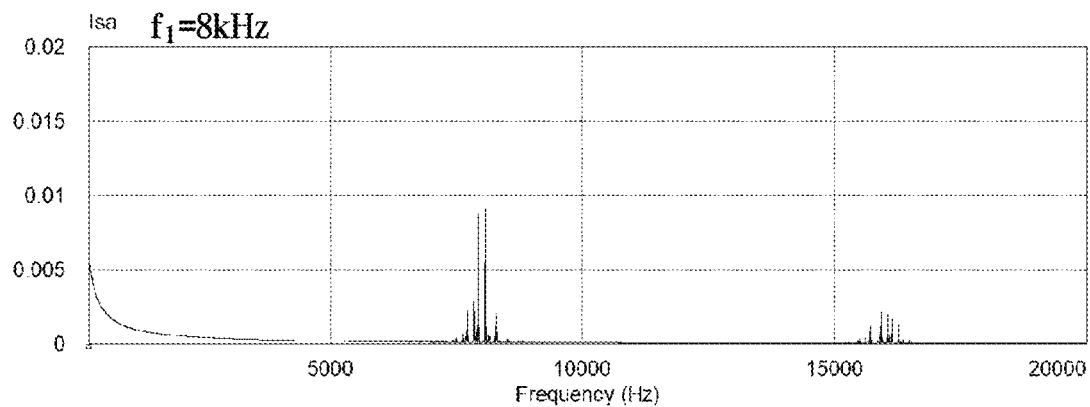
FIG. 6A is a diagram illustrating a Fast Fourier Transform (FFT) analysis result of a motor drive according to an embodiment of the disclosure.

FIG. 6A is a diagram illustrating a Fast Fourier Transform (FFT) analysis result of a motor drive according to an embodiment of the disclosure.

Figure 6B:
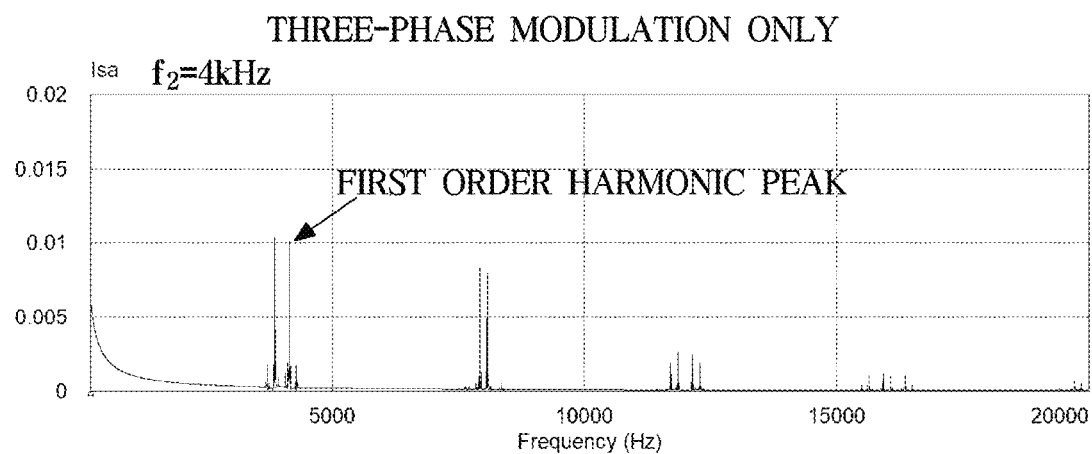
FIG. 6B is a diagram illustrating an FFT analysis result of a motor drive according to an embodiment of the disclosure.

FIG. 6B is a diagram illustrating an FFT analysis result of a motor drive according to an embodiment of the disclosure.

Figure 6C:
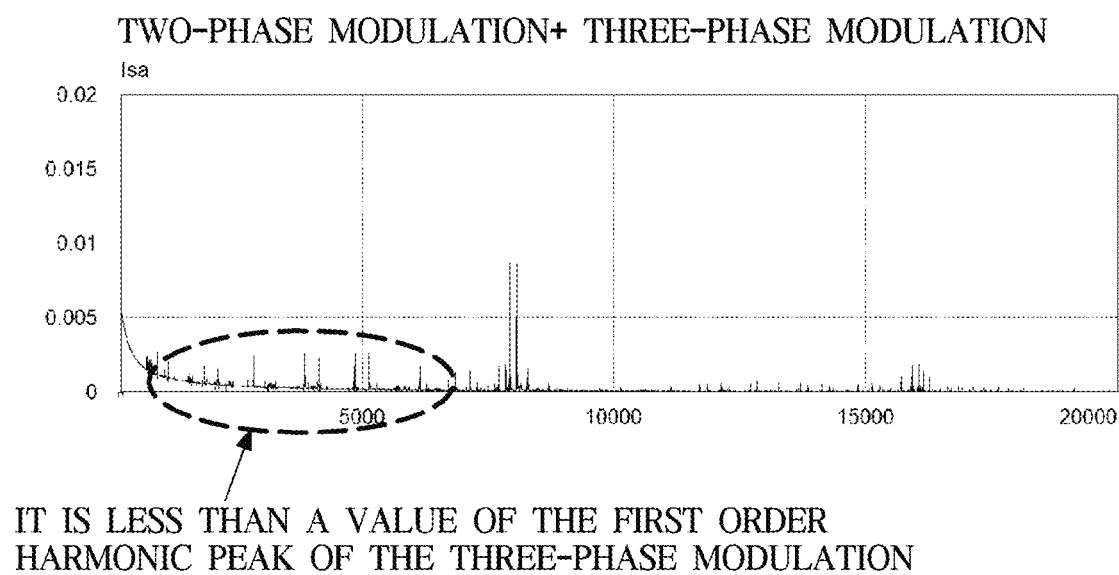
FIG. 6C is a diagram illustrating an FFT analysis result of a motor drive according to an embodiment of the disclosure.

FIG. 6C is a diagram illustrating an FFT analysis result of a motor drive according to an embodiment of the disclosure.

According a predetermined carrier frequency, the motor drive 200 may perform a combination of the first control mode according to the two-phase modulation and the second control mode according to the three-phase modulation. Accordingly, referring to FIGS. 6A, 6B, and 6C, a frequency component of the motor drive 200 may be smaller than a first order harmonic peak in a case of performing only the three-phase modulation, and the noise of the motor drive 200 may be suppressed to the same level as the case of PWM control with only the two-phase modulation.

FIG. 7A is a diagram illustrating a line voltage generation timing of a motor drive according to an embodiment of the disclosure.

Figure 7B:
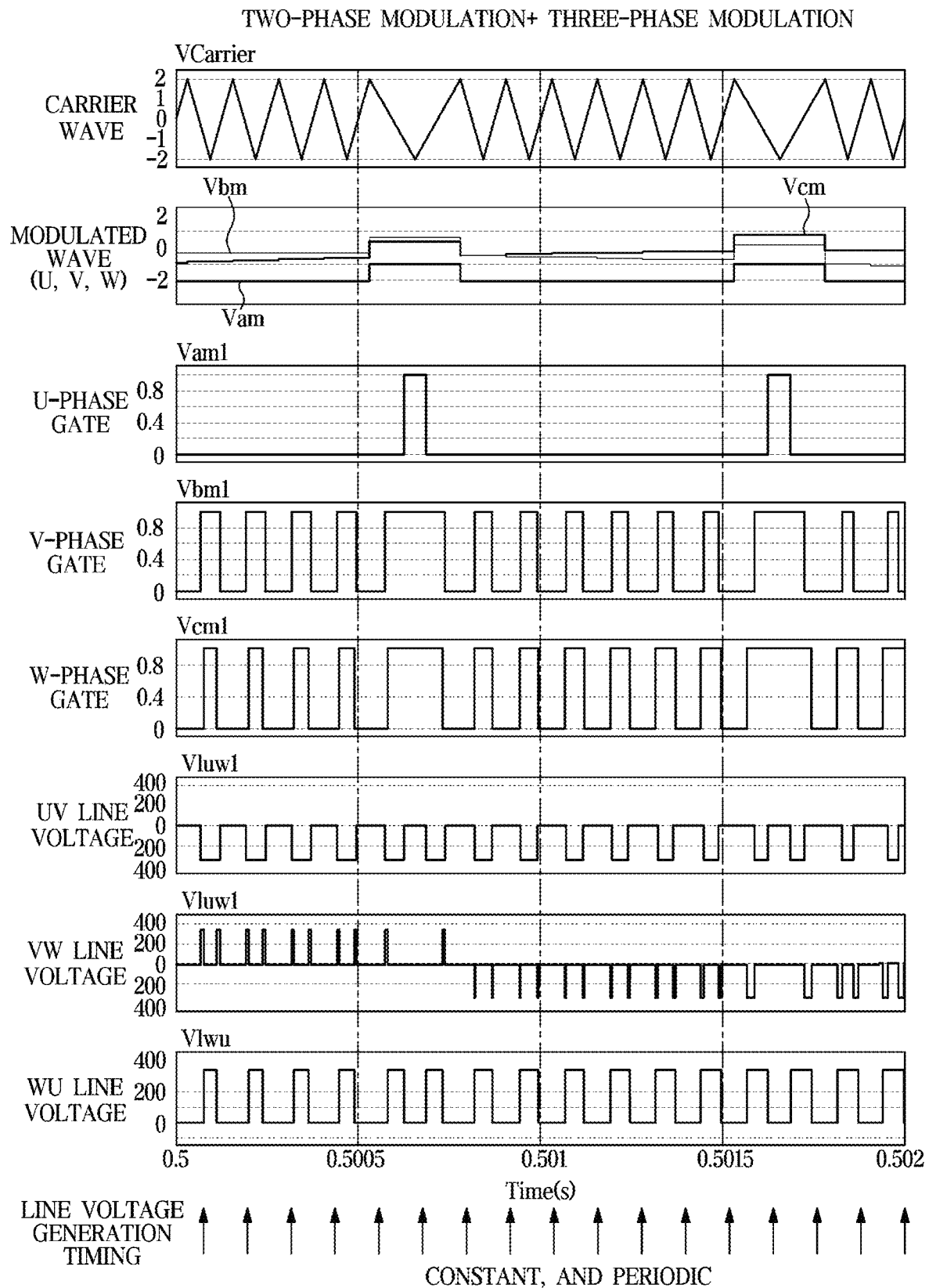
FIG. 7B is a diagram illustrating a line voltage generation timing of a motor drive according to an embodiment of the disclosure.

FIG. 7B is a diagram illustrating a line voltage generation timing of a motor drive according to an embodiment of the disclosure.

Referring to FIGS. 7A and 7B, by setting the first carrier frequency f1 and the second carrier frequency f2 to satisfy the relationship of the above Formula 1, the motor drive 200 may allow a line voltage generation period to be the same as a line voltage generation period in a driving method using only the two-phase modulation. Therefore, even in the performance of the combination of the two-phase modulation and the third-phase modulation, the motor drive 200 may suppress the noise to the same level as the driving method using only the two-phase modulation.

Figure 8A:
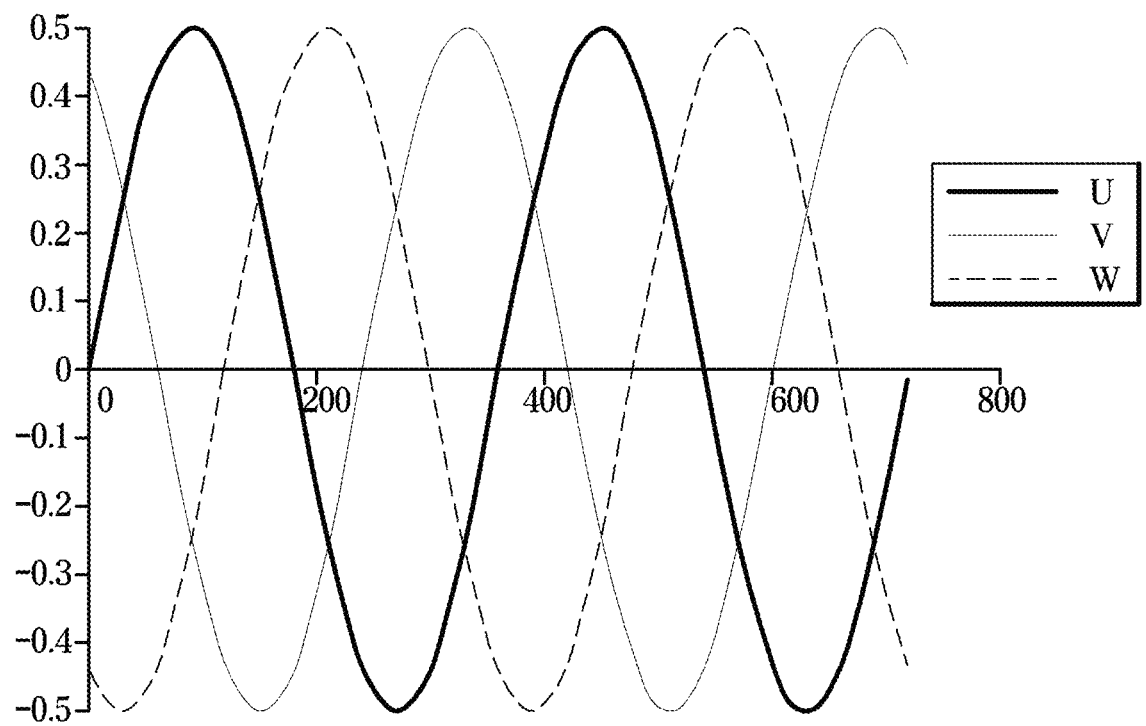
FIG. 8A is a diagram illustrating a modulation method in a second control mode of a motor drive according to an embodiment of the disclosure.

FIG. 8A is a diagram illustrating a modulation method in a second control mode of a motor drive according to an embodiment of the disclosure.

Figure 8B:
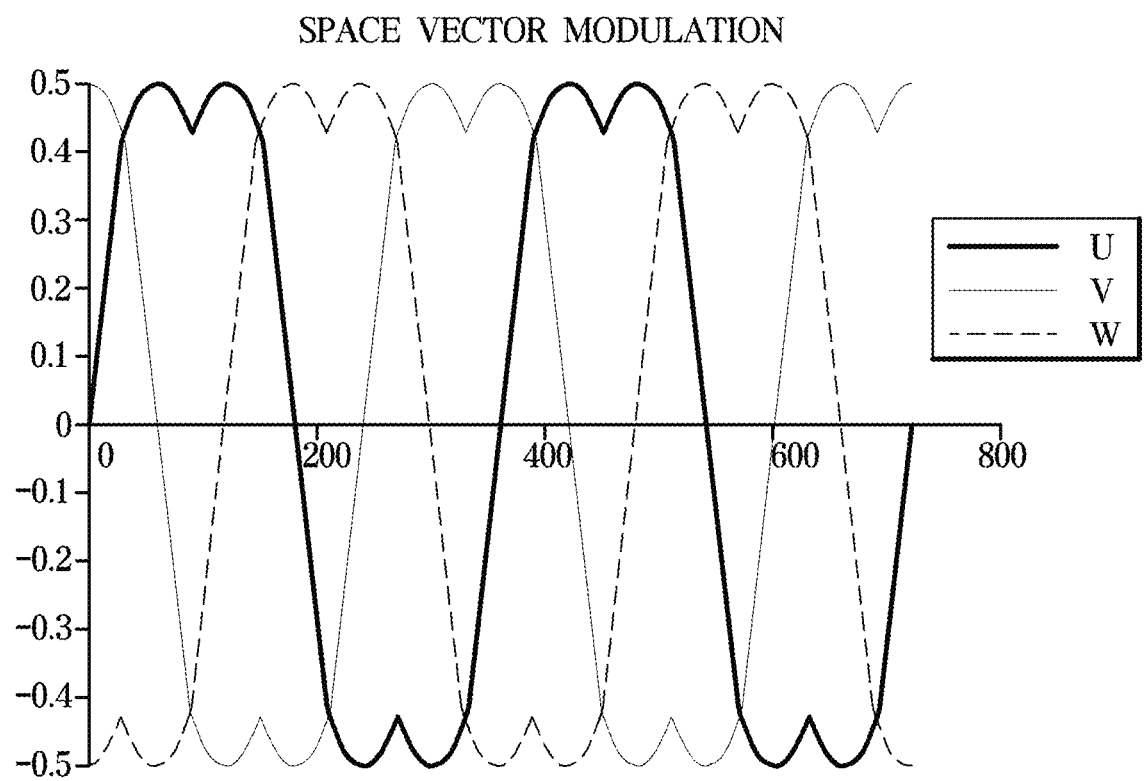
FIG. 8B is a diagram illustrating a modulation method in a second control mode of a motor drive according to an embodiment of the disclosure.

FIG. 8B is a diagram illustrating a modulation method in a second control mode of a motor drive according to an embodiment of the disclosure.

Referring to FIGS. 8A and 8B, the motor drive 200 may employ the three-phase modulation in the second control mode, but is not limited thereto. For example, in the second control mode, the motor drive 200 may use space vector modulation in which an output voltage is enlarged using the three-phase modulation. Because a three-phase reference voltage is 0 volts and the inverter circuit 210 switches three phases based on the three-phase reference voltage, the periodicity of the line voltage of the inverter circuit 210 may be maintained, and thus the space vector modulation, in which the output voltage is enlarged, may have the same effect as the three-phase modulation method. Alternatively, any modulation method may be applied as long as the three-phase reference voltage is set to near 0 volts to maintain the periodicity of the line voltage by switching the three-phase switches.

Figure 9A:
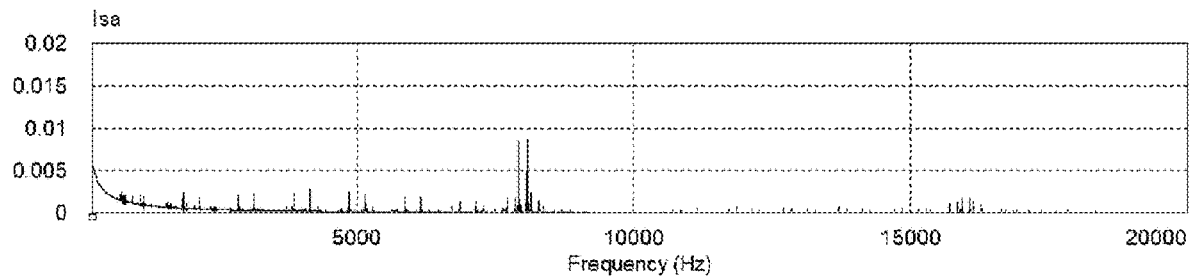
FIG. 9A is a diagram illustrating an FFT analysis result of a motor drive according to an embodiment of the disclosure.

FIG. 9A is a diagram illustrating an FFT analysis result of a motor drive according to an embodiment of the disclosure.

Figure 9B:
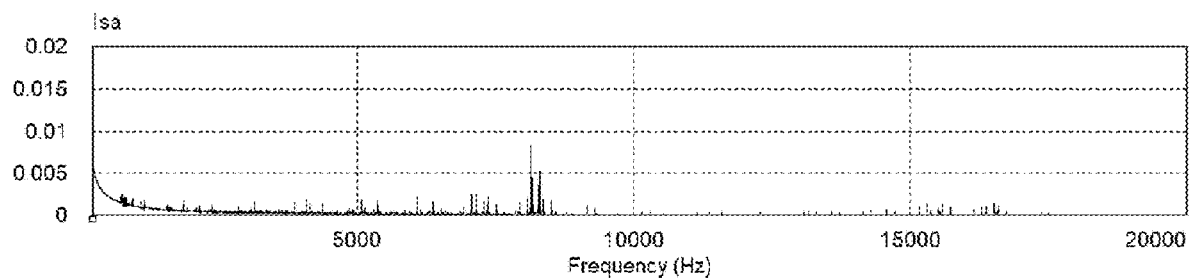
FIG. 9B is a diagram illustrating an FFT analysis result of a motor drive according to an embodiment of the disclosure.

FIG. 9B is a diagram illustrating an FFT analysis result of a motor drive according to an embodiment of the disclosure.

Figure 9C:
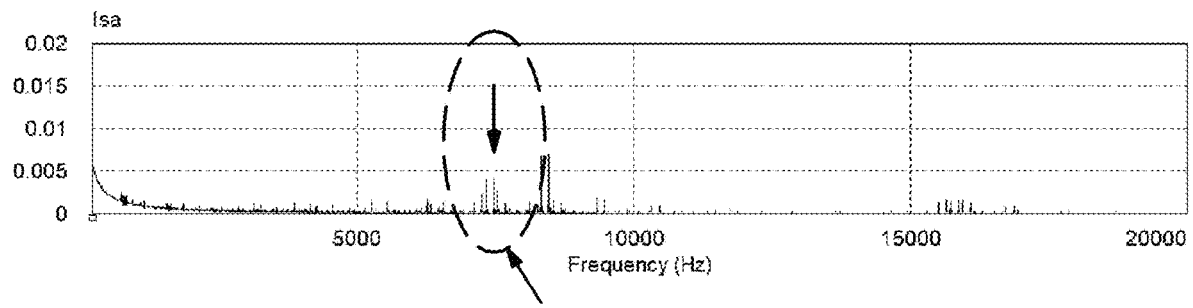
FIG. 9C is a diagram illustrating an FFT analysis result of a motor drive according to an embodiment of the disclosure.

FIG. 9C is a diagram illustrating an FFT analysis result of a motor drive according to an embodiment of the disclosure.

Figure 9D:
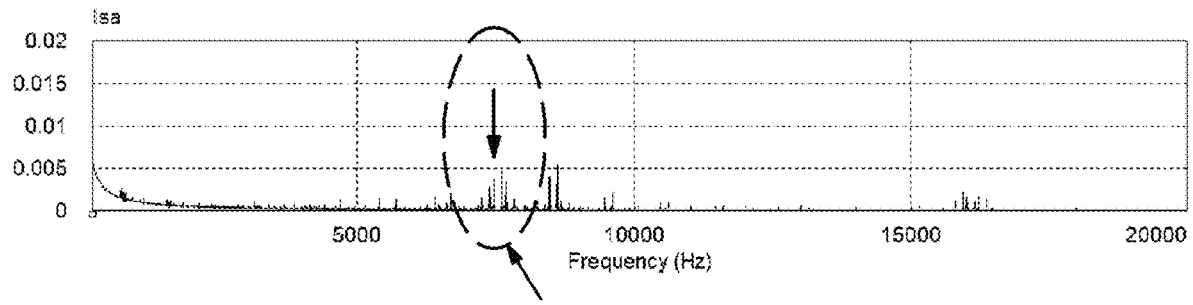
FIG. 9D is a diagram illustrating an FFT analysis result of a motor drive according to an embodiment of the disclosure.

FIG. 9D is a diagram illustrating an FFT analysis result of a motor drive according to an embodiment of the disclosure.

Figure 9E:
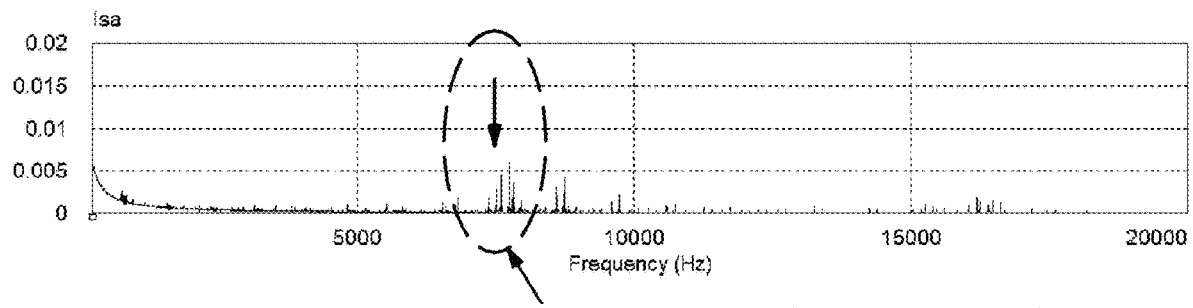
FIG. 9E is a diagram illustrating an FFT analysis result of a motor drive according to an embodiment of the disclosure.

FIG. 9E is a diagram illustrating an FFT analysis result of a motor drive according to an embodiment of the disclosure.

Referring to FIGS. 9A, 9B, 9C, 9D, and 9E, as the second carrier frequency f2 increases, the periodicity of the line voltage generation timing may decrease, and thus a peak may occur at a frequency other than the first order harmonic wave of the first control mode. Accordingly, the noise performance may be unacceptably deteriorated. For example, in the case of the compressor, a carrier frequency may be set outside a resonant frequency range of the compressor. At this time, referring to FIGS. 9A, 9B, 9C, 9D, and 9E, when a peak occurs at a frequency lower than the first order harmonic wave of the first control mode, the peak may occur in the resonant frequency range of the compressor, and thus the noise may be greatly increased. Accordingly, the second carrier frequency may be set in a range in which a shape of the first order component of the current FFT in the first control mode does not change. In addition, a ratio of the second carrier frequency f2 to the first carrier frequency f1 may be between 0.4 and 0.6.

Figure 10A:
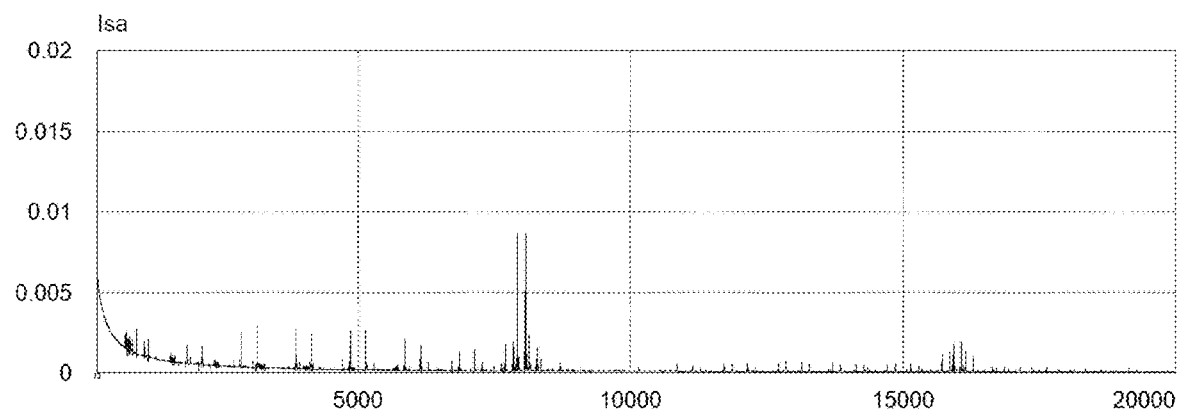
FIG. 10A is a diagram illustrating an FFT analysis result of a motor drive according to an embodiment of the disclosure.

FIG. 10A is a diagram illustrating an FFT analysis result of a motor drive according to an embodiment of the disclosure.

Figure 10B:
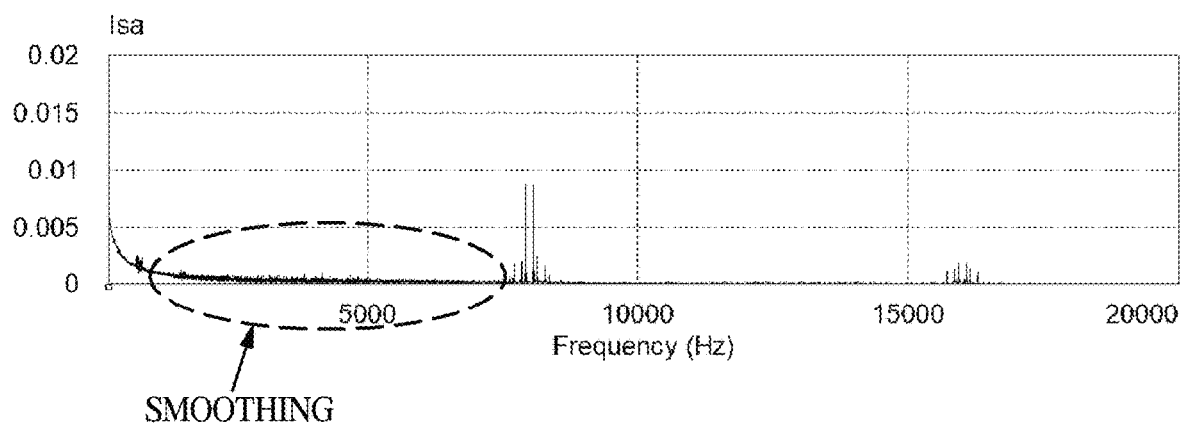
FIG. 10B is a diagram illustrating an FFT analysis result of a motor drive according to an embodiment of the disclosure.

FIG. 10B is a diagram illustrating an FFT analysis result of a motor drive according to an embodiment of the disclosure.

Referring to FIGS. 10A and 10B, the PWM controller 220 may be configured to randomly set a timing for performing the second control mode. Accordingly, in comparison with a case of setting the second control mode to perform regularly, a fundamental wave in the three-phase modulation and a peak of a low-order harmonic wave, which is generated by switching of the control mode, may be smoothed in a case of setting the second control mode to perform randomly. Further, the noise may be greatly reduced. The timing of performing the second control mode may be determined by using a random function, such as a linear congruential method or M-sequence random numbers, but the random function is not limited thereto.

In addition, the PWM controller 220 according to an embodiment may allow a ratio of a period of time, in which a PWM signal is output according to the first control mode, to be greater than a ratio of a period of time, in which a PWM signal is output according to the second control mode, in a predetermined unit time. In other words, the PWM controller 220 may be configured to the perform PWM control mainly according to the first control mode, and to combine the performance of the second control mode thereto.

Figure 11A:
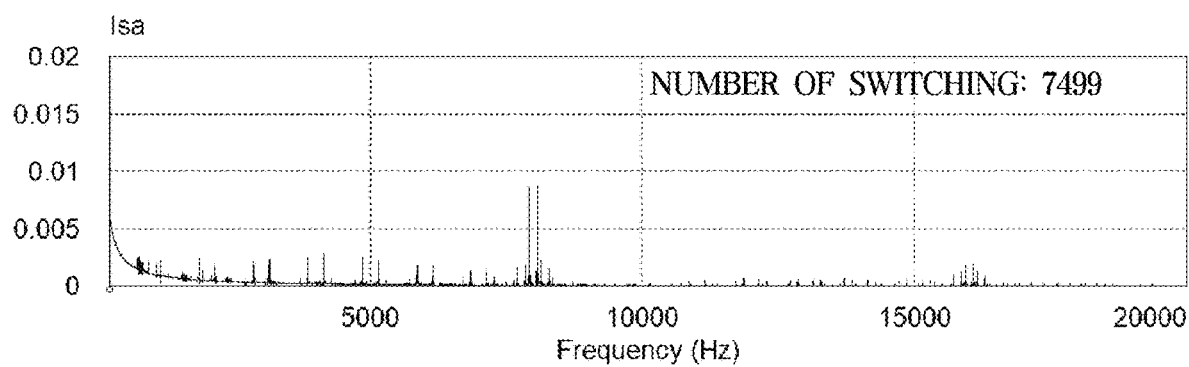
FIG. 11A is a diagram illustrating an FFT analysis result of a motor drive according to an embodiment of the disclosure.

FIG. 11A is a diagram illustrating an FFT analysis result of a motor drive according to an embodiment of the disclosure.

Figure 11B:
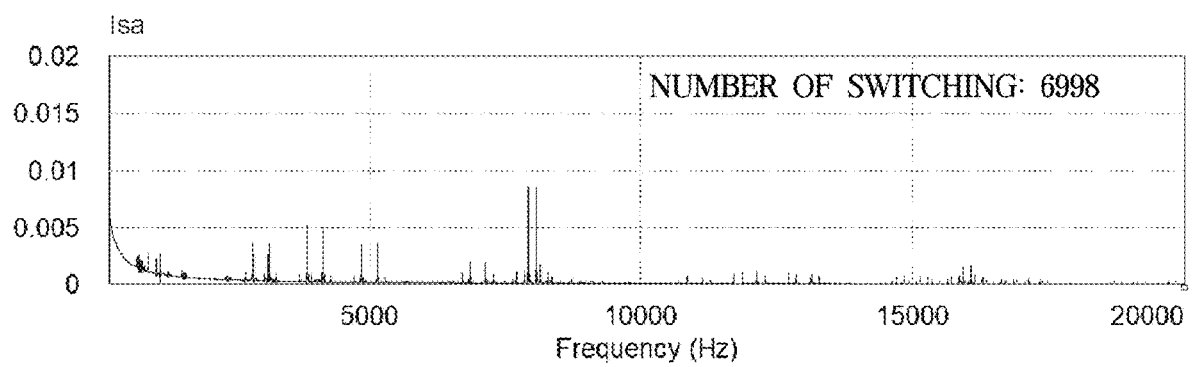
FIG. 11B is a diagram illustrating an FFT analysis result of a motor drive according to an embodiment of the disclosure.

FIG. 11B is a diagram illustrating an FFT analysis result of a motor drive according to an embodiment of the disclosure.

Figure 11C:
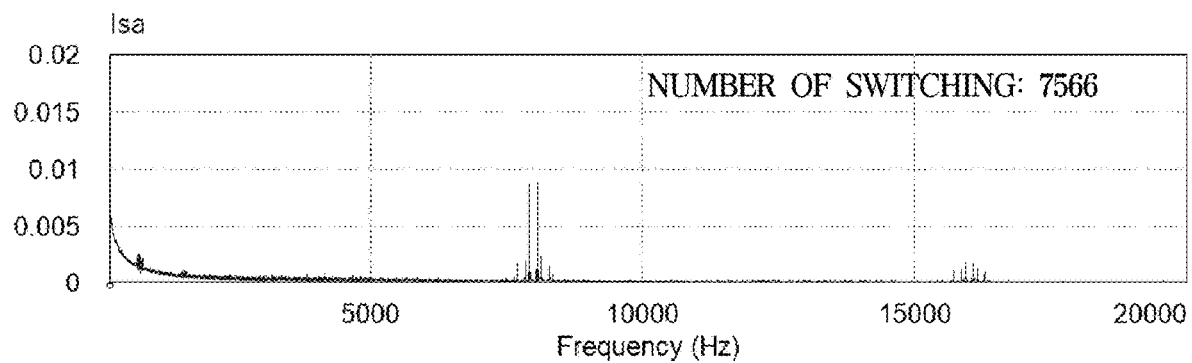
FIG. 11C is a diagram illustrating an FFT analysis result of a motor drive according to an embodiment of the disclosure.

FIG. 11C is a diagram illustrating an FFT analysis result of a motor drive according to an embodiment of the disclosure.

Figure 11D:
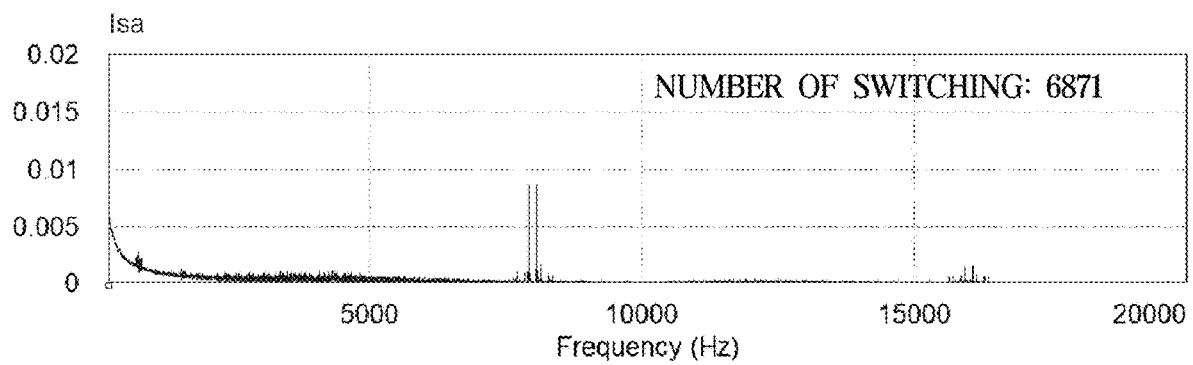
FIG. 11D is a diagram illustrating an FFT analysis result of a motor drive according to an embodiment of the disclosure.

FIG. 11D is a diagram illustrating an FFT analysis result of a motor drive according to an embodiment of the disclosure.

Referring to FIGS. 11A, 11B, 11C, and 11D, for example, in the predetermined unit time, the sum of the ratio of a period of PWM control according to the first control mode and the radio of a period of PWM control according to the second control mode may be 100%, and as the ratio of the second control mode increases, the number of switching may decrease and switching losses may decrease. In response that the ratio of the period of PWM control according to the second control mode is reduced, the impact of the combination of the two-phase modulation method and the three-phase modulation method on the noise may be small, but the effect of reducing the switching loss may be reduced. In response that the ratio of the period of PWM control according to the second control mode is increased, the impact of the combination of the two-phase modulation method and the three-phase modulation method on the noise may be large, but the effect of reducing the switching loss may be increased. In fact, because the inverter or the motor is often housed in a casing surrounded by metal, and the like, the noise is evaluated with the soundproofing performance and frequency characteristics of the casing, and the ratio of the second control mode may be adjusted to be maximized in a range in which the noise increase is minimized.

In the predetermined unit time, the ratio of the PWM control period according to the second control mode may be set to less than 50%.

Figure 12:
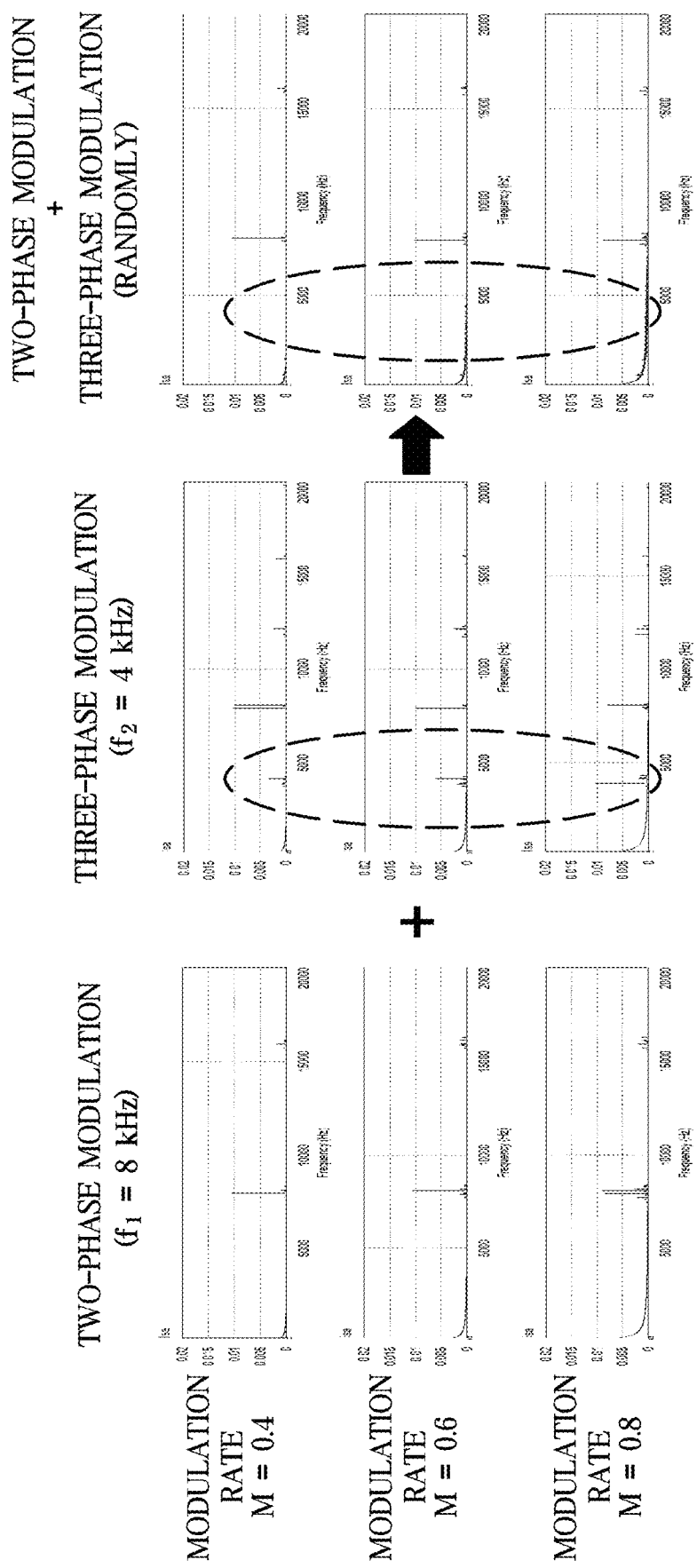
FIG. 12 is a diagram illustrating an FFT analysis result of a motor drive according to an embodiment of the disclosure.

FIG. 12 is a diagram illustrating an FFT analysis result of a motor drive according to an embodiment of the disclosure.

Referring to FIG. 12, the PWM controller 220 may be configured to alternately switch the first control mode and the second control mode in response to a modulation rate of the inverter circuit 210 being equal to or less than a predetermined value, for example, 0.5. In other words, the PWM controller 220 may be configured to switch the first control mode and the second control mode at a timing, which is randomly set, during a period in which the modulation rate of the inverter circuit 210 is 0.5 or less. In response to the modulation rate of the inverter circuit 210 being 0.5 or less, the first order harmonic component of the second control mode is sufficiently small, and the effect of switching on the noise is small. Accordingly, even when the second control mode is combined with the first control mode, the impact of combination of the two-phase modulation and the three-phase modulation on the noise is also small. The PWM controller 220 may be configured to alternately switch the first control mode and the second control mode in response to the modulation rate of the inverter circuit 210 being 0.5 or less.

Effect of an Embodiment

As for the motor drive 200 according to an embodiment of the disclosure, the first control mode performed in the two-phase modulation and the second control mode performed in the three-phase modulation may be alternately switched and at the same time, the ratio of the second carrier frequency f2 to the first carrier frequency f1 may be set to 0.4 to 0.6. Therefore, the noise performance may be maintained at the same level as the driving method using only the two-phase modulation, and the switching loss may be reduced in comparison with the driving method using only the two-phase modulation.

For example, the first control mode according to the two-phase modulation and the second control mode according to the three-phase modulation are combined, and the carrier frequency f2 of the second control mode is less than the carrier frequency f1 of the first control mode. Accordingly, the number of switching may be reduced in comparison with the case of switching only with the two-phase modulation.

In addition, because the second carrier frequency f2 is set to about ½ of the first carrier frequency f1, a second order harmonic component of the three-phase modulation is combined with the first order harmonic component of the two-phase modulation, and thus the impact of the switching on the noise may be reduced. Further, because the second carrier frequency f2 is set to about ½ of the first carrier frequency f1, the line voltage generation period may be the same as that of the driving method using only the two-phase modulation, as illustrated in FIGS. 7A and 7B. Therefore, although the two-phase modulation is combined with the three-phase modulation, the noise may be suppressed to the same level as the driving method using only the two-phase modulation.

In addition, because the PWM controller 220 is configured to randomly set the timing of performing the second control mode, the peak of the fundamental wave of the three-phase modulation and the low-order harmonic wave generated by switching of the control mode may be smoothed, and the impact of the combination of the two-phase modulation and the three-phase modulation on the noise performance may be greatly reduced. Accordingly, the noise performance in the combination of the two-phase modulation and the three-phase modulation may be substantially the same as that of the driving method using only the two-phase modulation.

Other Modified Embodiments

Figure 13:
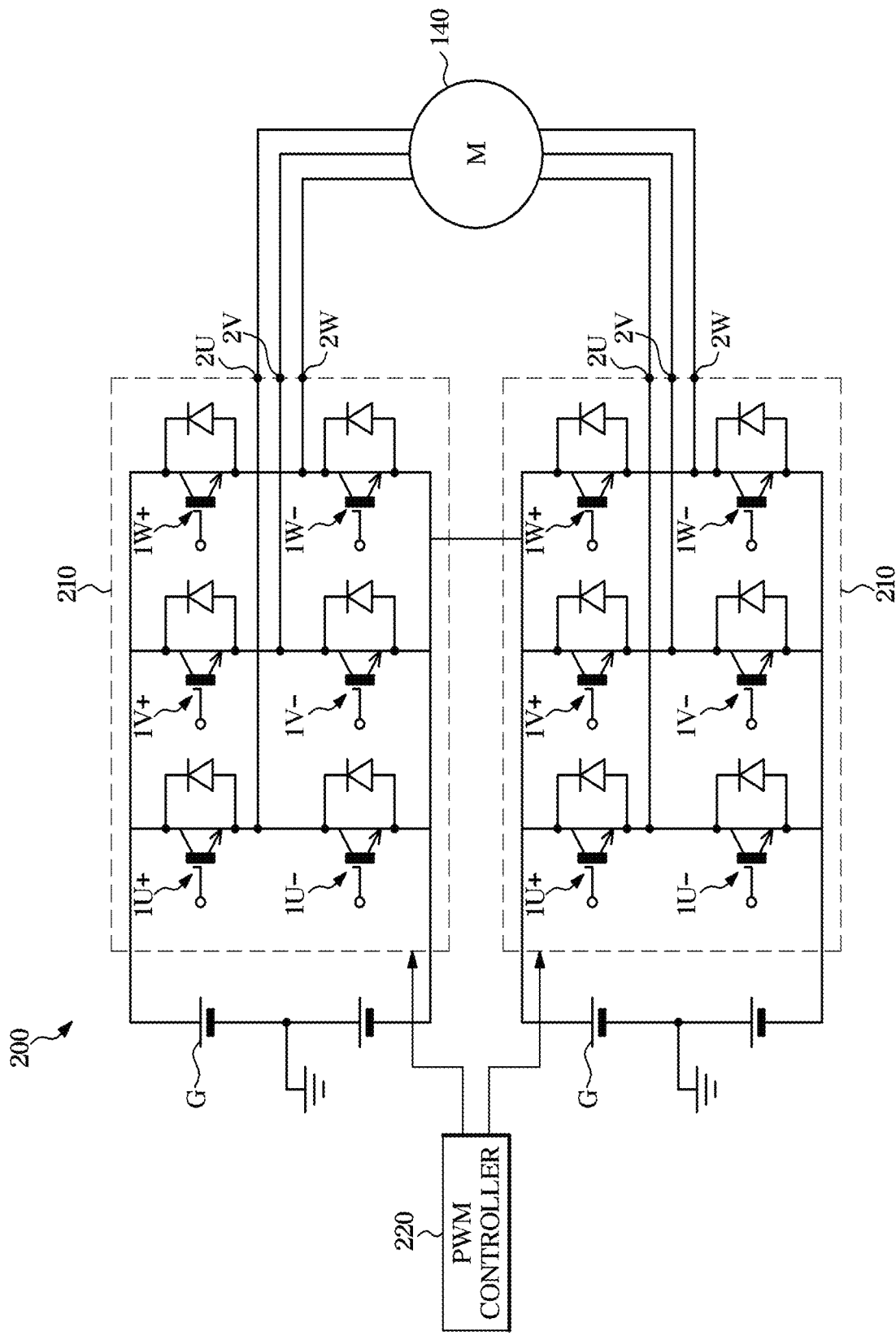
FIG. 13 is a schematic view illustrating a circuit configuration of a motor drive according to an embodiment of the disclosure.

FIG. 13 is a schematic view illustrating a circuit configuration of a motor drive according to an embodiment of the disclosure.

Referring to FIG. 13, the motor drive 200 according to an embodiment includes a single inverter circuit 210, but is not limited thereto. For example, the motor drive 200 may include a plurality of inverter circuits 210. Each inverter circuit 210 may be configured to supply AC power independently of each other for a common load (that is, a plurality of inverter circuits 210 may be multiplexed in parallel). In this case, the PWM controller 220 may be configured to output PWM signals independently of each other for each inverter circuit 210.

In addition, the motor drive 200 may include n inverter circuits 210 connected in a parallel and multiplexed manner, and the PWM controller 220 may output PWM signals, in which a phase of a carrier frequency, which is to determine a PWM signal period, is shifted to each other by 360/n°, to the inverter circuits 210. Accordingly, a torque ripple of the fundamental wave component of the three-phase modulation may be reduced, and the noise may be shifted to the high frequency side (n-order side). Therefore, the noise caused by the fundamental wave component may be further reduced. Therefore, in response to the shift of the phase of the inverter, a ratio of a period for outputting a PWM signal according to the second control mode may be further increased in the predetermined unit time, and the switching loss may be further reduced.

In the case in which the motor drive 200 includes two inverter circuits 210, the PWM controller 220 may control the inverter circuit 210 on one side according to lower-fixed two-phase modulation (that is, on-off state of the switching element of the three phase arms is sequentially fixed to the lower arm side at an electric angle of 120 degrees) and may control the inverter circuit 210 on the other side according to upper-fixed two-phase modulation (that is, on-off state of the switching element of the three phase arms is sequentially fixed to the upper arm side at an electric angle of 120 degrees) in the first control mode.

The motor drive 200 may be configured to randomly set a timing at which the PWM controller 220 switches between the first control mode and the second control mode, but is not limited thereto. For example, the PWM controller 220 may switch between the first control mode and the second control mode at a predetermined timing.

The motor drive 200 may be configured in such a way that the PWM controller 220 alternately switches between the first control mode and the second control mode in response to the modulation rate of the inverter circuit 210 being 0.5 or less. However, it is not limited thereto. For example, the motor drive 200 may be configured in such a way that the PWM controller 220 alternately switches between the first control mode and the second control mode in response to the modulation rate of the inverter circuit 210 being greater than 0.5.

The motor drive 200 may be configured in such a way that, according to the modulation rate of the inverter circuit 210, the PWM controller 220 changes a ratio of a period of outputting a PWM signal according to the first control mode and a ratio of a period of outputting a PWM signal according to the second control mode in the predetermine unit time. For example, the PWM controller 220 may be configured to increase the ratio of the second control mode as the modulation rate decreases, and decrease the ratio of the second control mode as the modulation rate increases. Alternatively, the PWM controller 220 may be configured to increase the ratio of the second control mode as the modulation rate increases.

Figure 14:
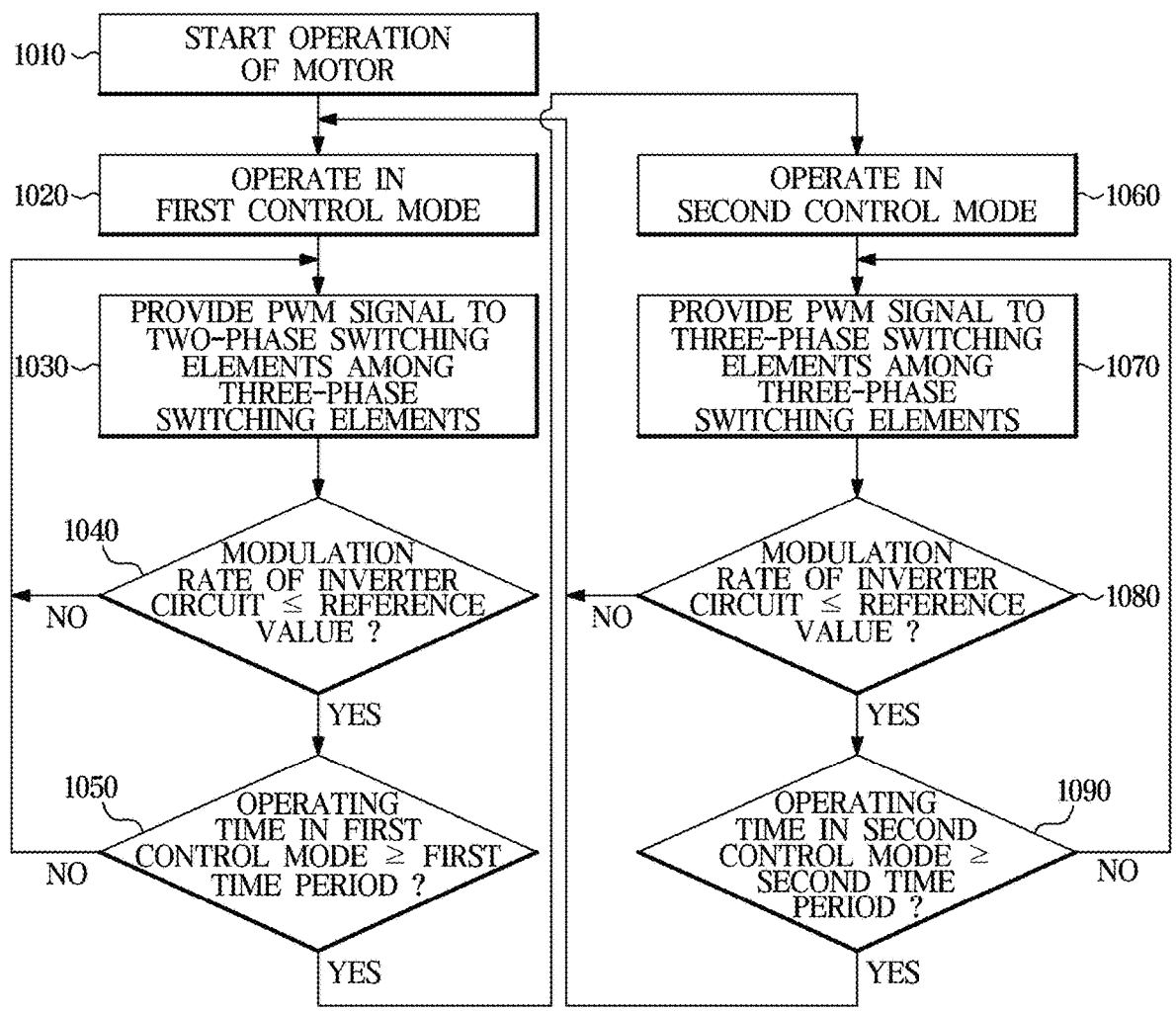
FIG. 14 is a flowchart illustrating an operation of a washing machine according to an embodiment of the disclosure.

FIG. 14 is a flowchart illustrating an operation of a washing machine according to an embodiment of the disclosure.

Referring to FIG. 14, an operation of the washing machine 100 will be described.

The washing machine 100 may start the operation of the motor 140 in operation 1010.

The washing machine 100 may start the motor 140 for washing, rinsing, or spinning. For example, the processor 190 may provide a drive signal for washing (or rinsing) or a drive signal for spinning to the motor drive 200. The motor drive 200 may provide a driving current to the motor 140 in response to a drive signal of the processor 190.

The washing machine 100 may operate in the first control mode (the two-phase modulation) in operation 1020. The washing machine 100 may provide a PWM signal to two-phase switching elements among the three-phase switching elements 1U+, 1V+, 1W+, 1U−, 1V−, and 1W− in operation 1030.

For example, the PWM controller 220 may operate in the first control mode in which PWM control is performed by outputting a PWM signal to two-phase switching elements among the three-phase switching elements by the two-phase modulation. The PWM controller 220 may provide a PWM signal, which is modulated according to a carrier signal including the first carrier frequency f1, to the inverter circuit 210.

The washing machine 100 may identify whether the modulation rate of the inverter circuit 210 is less than or equal to the reference value in operation 1040.

For example, the PWM controller 220 may switch an operation mode between the first control mode and the second control mode during the modulation rate of the inverter circuit 210 is less than or equal to the reference value. The reference value may be set empirically or experimentally. For example, the reference value may be 0.5.

In response to the modulation rate of the inverter circuit 210 exceeding the reference value (no in operation 1040), the washing machine 100 may continue to operate in the first control mode.

For example, the PWM controller 220 may operate in the first control mode in response to the modulation rate of the inverter circuit 210 exceeding the reference value.

In response to the modulation rate of the inverter circuit 210 being less than or equal to the reference value (yes in operation 1040), the washing machine 100 may identify whether an operating time in the first control mode is greater than or equal to a first time period in operation 1050.

For example, the PWM controller 220 may operate in the first control mode during the first time period. For example, the first time period may be a randomly determined time or a predetermined time.

In response to the operating time in the first control mode being less than the first time period (no in operation 1050), the washing machine 100 may continue the operation in the first control mode.

In response to the operating time in the first control mode being greater than or equal to the first time period (yes in operation 1050), the washing machine 100 may operate in the second control mode in operation 1060. The washing machine 100 may provide a PWM signal to three-phase switching elements among the three-phase switching elements 1U+, 1V+, 1W+, 1U−, 1V−, and 1W− in operation 1070.

For example, the PWM controller 220 may operate in the second control mode in which PWM control is performed by outputting a PWM signal to three-phase switching elements among the three-phase switching elements by the three-phase modulation. The PWM controller 220 may provide a PWM signal, which is modulated according to a carrier signal including the second carrier frequency f2, to the inverter circuit 210.

The washing machine 100 may identify whether the modulation rate of the inverter circuit 210 is less than or equal to the reference value in operation 1080.

For example, the PWM controller 220 may switch the operation mode between the first control mode and the second control mode during the modulation rate of the inverter circuit 210 is less than or equal to the reference value.

In response to the modulation rate of the inverter circuit 210 exceeding the reference value (no in operation 1040), the washing machine 100 may operate in the first control mode.

For example, the PWM controller 220 may operate in the first control mode in response to the modulation rate of the inverter circuit 210 exceeding the reference value.

In response to the modulation rate of the inverter circuit 210 being less than or equal to the reference value (yes in operation 1080), the washing machine 100 may identify whether the operating time in the second control mode is greater than or equal to a second time period in operation 1090.

For example, the PWM controller 220 may operate in the second control mode for the second time period. For example, the second time period may be a randomly determined time or a predetermined time.

In response to the operating time in the second control mode being less than the second time period (no in operation 1090), the washing machine 100 may continue the operation in the second control mode.

In response to the operating time in the second control mode being greater than or equal to the second time period (yes in operation 1090), the washing machine 100 may operate in the first control mode in operation 1020.

As mentioned above, the washing machine 100 may alternately switch between the first control mode and the second control mode during the modulation rate of the inverter circuit 210 is less than or equal to the reference value.

According to an embodiment of the disclosure, the motor drive may include the switching element connected in the three-phase bridge type, the inverter circuit configured to turn on and off the switching element so as to convert input DC power into AC power and configured to output the AC power to a load, and the PWM controller configured to output a PWM signal to the switching element. The PWM controller may be configured to alternately switch between the first control mode, in which PWM control is performed by outputting a PWM signal to two-phase switching elements among three-phase switching elements by the two-phase modulation, and the second control mode, in which PWM control is performed by outputting a PWM signal to entire the three-phase switching elements by the three-phase modulation. The first carrier frequency f1 that is to determine the PWM period of the first control mode and the second carrier frequency f2 that is to determine the PWM period of the second control mode may satisfy the relationship of the following Formula 2.

$$0.4 \leq f2/f1 \leq 0.6 \qquad \text{Formula 2}$$

As mentioned above, the first control mode performed in the two-phase modulation and the second control mode performed in the three-phase modulation may be alternately switched and at the same time, the ratio of the second carrier frequency f2 to the first carrier frequency f1 may be set to 0.4 to 0.6. Accordingly, the noise performance may be maintained at the same level as the driving method using only the two-phase modulation, and the switching loss may be reduced in comparison with the driving method using only the two-phase modulation.

That is, the first control mode according to the two-phase modulation and the second control mode according to the three-phase modulation are combined, and the carrier frequency f2 of the second control mode is less than the carrier frequency f1 of the first control mode. Accordingly, the number of switching may be reduced in comparison with the case of switching only with the two-phase modulation.

In addition, because the second carrier frequency f2 is set to about ½ of the first carrier frequency f1, the second order harmonic component of the three-phase modulation is combined with the first order harmonic component of the two-phase modulation, and thus the noise may be reduced. Further, because the second carrier frequency f2 is set to about ½ of the first carrier frequency f1, the line voltage generation period may be the same as that of the driving method using only the two-phase modulation, as illustrated in FIGS. 7A and 7B. Therefore, although the two-phase modulation is combined with the three-phase modulation, the noise may be suppressed to the same level as the driving method using only the two-phase modulation.

In response to the ratio of the second carrier frequency f2 to the first carrier frequency f1 being less than 0.4, a second order harmonic peak of the second control mode (the three-phase modulation) may occur at a frequency lower than the first order harmonic wave of the first control mode (the two-phase modulation). Accordingly, the noise may be unacceptably deteriorated. Further, in response to the ratio of the second carrier frequency f2 to the first carrier frequency f1 exceeding 0.6, the periodicity of the line voltage generation timing may decrease. Accordingly, the frequency peak around the first order harmonic wave may increase. Therefore, the noise may be unacceptably deteriorated. Accordingly, the ratio of the second carrier frequency f2 to the first carrier frequency f1 may be set to 0.4 to 0.6.

The motor drive may be configured to set a second carrier frequency f2 that does not change the shape of the first order harmonic wave due to the two-phase modulation in the FFT analysis.

Accordingly, because the frequency band and peak of the noise due to the first order harmonic wave are not changed, it may not be required to change the noise countermeasure component, such as a sound insulation material.

"The shape of the first order harmonic wave is not changed due to the two-phase modulation in the FFT analysis" may mean that the spread of the first order harmonic frequency band and the peak thereof are equivalent in the current FFT analysis result.

The motor drive may be configured to allow the ratio of the period for outputting the PWM signal according to the first control mode to be greater than the ratio of the period for outputting the PWM signal according to the second control mode in the predetermined unit time.

In response to the ratio of the period for outputting the PWM signal according to the second control mode being less than 5% in the predetermined unit time, the effect of reducing the switching loss may be reduced. On the other hand, in response to the ratio of the period for outputting the PWM signal according to the second control mode being 50% or more, the noise may increase due to an increase in the fundamental wave component of the three-phase modulation.

Accordingly, the motor drive may allow the ratio of the period of outputting the PWM signal according to the second control mode to be greater than or equal to 5%, but less than 50% in the predetermined unit time.

According to the modulation rate of the inverter circuit, the PWM controller may change the ratio of the period for outputting the PWM signal according to the first control mode and the ratio of the period for outputting the PWM signal according to the first control mode in the predetermined unit time. For example, as the modulation rate decreases, the ratio of the second control mode may increase, and as the modulation rate increases, the ratio of the second control mode may decrease.

Accordingly, the impact on the noise may be optimized or uniformed across the modulation rate.

Further, in the case of a product in which mechanical noise is dominant at a high modulation rate, such as a washing machine, the ratio of the second control mode may increase as the modulation rate increases. The noise of the inverter may be reduced, and switching losses may be reduced.

The motor drive may be configured to randomly set a timing at which the PWM controller performs the second control mode.

Accordingly, the fundamental wave in the three-phase modulation and a peak of a low-order harmonic wave, which is generated by switching of the control mode, may be smoothed, and thus the noise may be reduced. Therefore, the noise may be almost the same as the driving method using only the two-phase modulation.

As the modulation rate of the inverter circuit is lowered, the first order harmonic component of the three-phase modulation may decrease, and the noise may decrease. Accordingly, the ratio of the second control mode (the three-phase modulation) may increase, and the switching loss may be further reduced in the equivalent noise performance.

Accordingly, the motor drive may be configured in such a way that the PWM controller switches the first control mode and the second control mode based on the modulation rate of the inverter circuit being equal to or less than a predetermined value. For example, the motor drive may be configured in such a way that the PWM controller switches the first control mode and the second control mode based on the modulation rate of the inverter circuit that the first order harmonic component of the three-phase modulation is lower than the second order harmonic component.

In this case, the "modulation rate of the inverter circuit" as used herein refers to a ratio of an output voltage to the load to an input voltage to the inverter circuit.

As an example, the motor drive may include the plurality of inverter circuits, and each inverter circuit may be configured to supply AC power to the load, independently of each other.

In this case, switching losses in each inverter circuit may be reduced.

The motor drive may include n inverter circuits and the phase of the carrier frequency, which is outputted from the PWM controller to each of the inverter circuit to determine the PWM signal period, may be shifted to each other by $360/n°$.

Accordingly, the torque ripple of the fundamental wave component of the three-phase modulation may be reduced, and the noise may be shifted to the high frequency side (n-order side). Therefore, the noise caused by the fundamental wave component may be further reduced. Therefore, in response to the shift of the phase of the inverter, a ratio of a period for outputting a PWM signal according to the second control mode may be further increased in the predetermined unit time, and the switching loss may be further reduced.

The motor drive may include two inverter circuits, and in the first control mode, the PWM controller may control the inverter circuit on one side according to the lower-fixed two-phase modulation and may control the inverter circuit on the other side according to the upper-fixed two-phase modulation.

Accordingly, in the lower fixed two-phase modulation, a line voltage may occur with respect to a valley of the carrier and in the upper-fixed two-phase modulation, a line voltage may occur with respect to a peak of the carrier. Therefore, the line voltage may be consistent with that is shifted by 180°.

According to an embodiment of the disclosure, the motor drive may include the switching element connected in the three-phase bridge type, the inverter circuit configured to turn on and off the switching element to convert input DC power into AC power and configured to output the AC power to a load, and the PWM controller configured to output a PWM signal to the switching element. The PWM controller may be configured to alternately switch between the first control mode, in which PWM control is performed by outputting a PWM signal to two-phase switching elements of three-phase switching elements by the two-phase modulation, and the second control mode, in which PWM control is performed by outputting a PWM signal to entire the three-phase switching elements by the space vector modulation. The first carrier frequency f1 that is to determine the PWM period of the first control mode and the second carrier frequency f2 that is to determine the PWM period of the second control mode may satisfy the relationship of the following Formula 3.

$$0.4 \leq f2/f1 \leq 0.6 \qquad \text{Formula 3}$$

According to an embodiment, the washing machine includes the inner tub, the motor connected to the inner tub through the rotating shaft, the inverter circuit operatively connected to the motor and including three pairs of bridged switching elements, and the processor configured to provide a modulation signal to the inverter circuit to turn on or off the three pairs of switching elements so as to convert DC power into AC power. The processor is configured to provide the modulation signal to two pairs of switching elements among the three pairs of switching elements for the first time period in the first mode, configured to provide the modulation signal to the three pairs of switching elements for the second time period in the second mode, and configured to alternately perform the first mode and the second mode.

The processor may be configured to provide a first carrier signal for a first pulse width modulation in the first mode, configured to provide a second carrier signal for a second pulse width modulation in the second mode, and configured to allow a frequency of the first carrier signal to be greater than a frequency of the second carrier signal.

The processor may be configured to allow the frequency of the second carrier signal to be between 0.4 times and 0.6 times the frequency of the first carrier signal.

The processor may be configured to allow the first time period in the first mode to be greater than the second time period in the second mode.

The processor may be configured to allow a ratio of the second time period to a sum of the first time period and the second time period to be between 5% and 50%.

The processor may be configured to change the first time period and the second time period based on a modulation rate of the inverter circuit.

The processor may be configured to change a ratio of the second time period to the sum of the first time period and the second time period based on a modulation rate of the inverter circuit.

The processor may be configured to perform switching between the first mode and the second mode, based on a modulation rate of the inverter circuit being less than or equal to a reference value.

The processor may be configured to increase the ratio of the second time period to the sum of the first time period and the second time period as the modulation rate of the inverter circuit decreases, and the processor may be configured to reduce the ratio of the second time period to the sum of the first time period and the second time period as the modulation rate of the inverter circuit increases.

The washing machine may further include a plurality of inverter circuits including the inverter circuit. The processor may be configured to provide AC power to each of the plurality of inverter circuits, independently of each other.

The washing machine may further include n inverter circuits including the inverter circuit. The processor may be configured to provide n carrier signals that modulate a modulation signal output to the n inverter circuits, and configured to allow the n carrier signals to be shifted from each other by 360/n°.

As is apparent from the above description, the washing machine may include an inverter circuit configured to further reduce switching losses while suppressing noise performance to a level equivalent to that of a two-phase modulation method.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A washing machine comprising:
    an inner tub;
    a motor connected to the inner tub through a rotating shaft;
    an inverter circuit operatively connected to the motor and comprising three pairs of bridged switching elements; and
    at least one processor configured to provide a modulation signal to the inverter circuit to turn on or off the three pairs of bridged switching elements so as to convert DC power into AC power,
    wherein the at least one processor is configured to:
        provide the modulation signal to two pairs of switching elements among the three pairs of bridged switching elements for a first time period in a first mode,
        provide the modulation signal to the three pairs of bridged switching elements for a second time period in a second mode, and
        alternately perform the first mode and the second mode,
    wherein the at least one processor is further configured to:
        provide a first carrier signal for a first pulse width modulation in the first mode, provide a second carrier signal for a second pulse width modulation in the second mode, and
    wherein a frequency of the second carrier signal is a frequency between 0.4 times and 0.6 times a frequency of the first carrier signal and is a frequency to maintain a shape of a first order harmonic wave due to a two-phase modulation in a FFT analysis.

2. The washing machine of claim 1, wherein the at least one processor is further configured to allow the first time period in the first mode to be greater than the second time period in the second mode.

3. The washing machine of claim 1, wherein the at least one processor is further configured to allow a ratio of the second time period to a sum of the first time period and the second time period to be between 5% and 50%.

4. The washing machine of claim 1, wherein the at least one processor is further configured to change the first time period and the second time period based on a modulation rate of the inverter circuit.

5. The washing machine of claim 1, wherein the at least one processor is further configured to change a ratio of the second time period to a sum of the first time period and the second time period based on a modulation rate of the inverter circuit.

6. The washing machine of claim 1, wherein the at least one processor is further configured to perform switching between the first mode and the second mode, based on a modulation rate of the inverter circuit being less than or equal to a reference value.

7. The washing machine of claim 5, wherein the at least one processor is further configured to:
    increase the ratio of the second time period to the sum of the first time period and the second time period as the modulation rate of the inverter circuit decreases, and
    reduce the ratio of the second time period to the sum of the first time period and the second time period as the modulation rate of the inverter circuit increases.

8. The washing machine of claim 1, further comprising a plurality of inverter circuits comprising the inverter circuit,
    wherein the at least one processor is further configured to provide AC power to each of the plurality of inverter circuits, independently of each other.

9. The washing machine of claim 1, further comprising n inverter circuits comprising the inverter circuit,
    wherein the at least one processor is further configured to:
        provide n carrier signals that modulate a modulation signal output to the n inverter circuits, and
        allow the n carrier signals to be shifted from each other by 360/n°.

10. A control method of a washing machine comprising an inner tub and a motor connected to the inner tub through a rotating shaft, the method comprising:
    providing a modulation signal turning on or off three pairs of bridged switching elements to an inverter circuit operatively connected to the motor, the inverter circuit comprising the three pairs of bridged switching elements,
    wherein the providing of the modulation signal to the inverter circuit comprises:
        alternately performing a first mode and a second mode,
        providing the modulation signal to two pairs of switching elements among the three pairs of bridged switching elements for a first time period in the first mode, and
        providing the modulation signal to the three pairs of bridged switching elements for a second time period in the second mode,
    wherein the providing of the modulation signal to the inverter circuit further comprises:
        providing a first carrier signal for a first pulse width modulation in the first mode, and
        providing a second carrier signal for a second pulse width modulation in the second mode, and
    wherein a frequency of the second carrier signal is a frequency between 0.4 times and 0.6 times the frequency of a first carrier signal and is a frequency to maintain a shape of a first order harmonic wave due to a two-phase modulation in a FFT analysis.

11. The method of claim 10, wherein the first time period in the first mode is greater than the second time period in the second mode.

12. The method of claim 10, wherein a ratio of the second time period to a sum of the first time period and the second time period is between 5% and 50%.

13. The method of claim 10, wherein the providing of the modulation signal to the inverter circuit further comprises changing the first time period and the second time period based on a modulation rate of the inverter circuit.

14. The method of claim 10, wherein the providing of the modulation signal to the inverter circuit further comprises changing a ratio of the second time period to a sum of the first time period and the second time period based on a modulation rate of the inverter circuit.

15. The method of claim 10, wherein the alternately performing of the first mode and the second mode comprises switching from the first mode to the second mode at a certain point of time.

16. The method of claim 10, wherein the alternately performing of the first mode and the second mode comprises alternately performing the first mode and the second mode based on a modulation rate of the inverter circuit being less than or equal to a reference value.

* * * * *